United States Patent
Ikeda et al.

(10) Patent No.: US 6,919,003 B2
(45) Date of Patent: Jul. 19, 2005

(54) APPARATUS AND PROCESS FOR PRODUCING ELECTROPHORETIC DEVICE

(75) Inventors: Tsutomu Ikeda, Hachiohji (JP); Nobutaka Ukigaya, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 544 days.

(21) Appl. No.: 09/814,734

(22) Filed: Mar. 23, 2001

(65) Prior Publication Data

US 2003/0206329 A1 Nov. 6, 2003

(30) Foreign Application Priority Data

| Mar. 23, 2000 | (JP) | ........................... 2000-081919 |
| Mar. 23, 2000 | (JP) | ........................... 2000-081921 |
| May 11, 2000 | (JP) | ........................... 2000-138956 |
| May 11, 2000 | (JP) | ........................... 2000-138957 |
| Nov. 30, 2000 | (JP) | ........................... 2000-365076 |

(51) Int. Cl.[7] .............................................. C25D 13/12
(52) U.S. Cl. ........................ 204/490; 204/479; 427/435
(58) Field of Search .................. 204/479, 490; 427/435

(56) References Cited

U.S. PATENT DOCUMENTS

| 3,612,758 A | 10/1971 | Evans .................... 178/5.4 R |
| 5,279,511 A | 1/1994 | DiSanto et al. ................ 445/24 |
| 6,052,507 A | 4/2000 | Niida et al. .................... 386/68 |
| 6,072,621 A | 6/2000 | Kishi et al. ................. 359/296 |
| 6,221,267 B1 | 4/2001 | Ikeda et al. ................... 216/24 |

FOREIGN PATENT DOCUMENTS

| JP | 8-502599 | 3/1996 |
| JP | 9-185087 | 7/1997 |
| JP | 11-38898 | 2/1999 |
| JP | 11-202804 | 7/1999 |

*Primary Examiner*—Kishor Mayekar
(74) *Attorney, Agent, or Firm*—Fitzpatrick, Cella, Harper & Scinto

(57) ABSTRACT

A system (apparatus and process) for producing an electrophoretic (display) device is provided for allowing production of such a device wherein electrophoretic particles in the dispersion liquid are easily and evenly distributed to respective cells (pixels) between two substrates of the device even in the case of a very small gap between the two substrates or the case of using a flexible substrate. The system includes a storage unit for a dispersion liquid containing the charged phoretic particles dispersed therein, a stirrer for stirring the dispersion liquid, a substrate-holder for holding the substrate in the dispersion liquid, and a voltage source for applying a voltage to the electrodes formed on the substrate thereby depositing the electrophoretic particles on the electrodes.

41 Claims, 24 Drawing Sheets

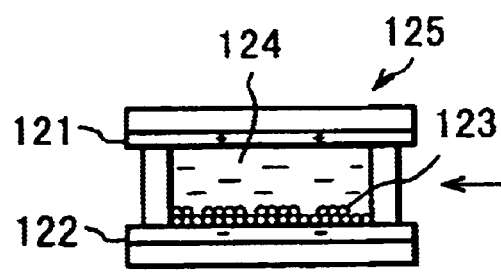
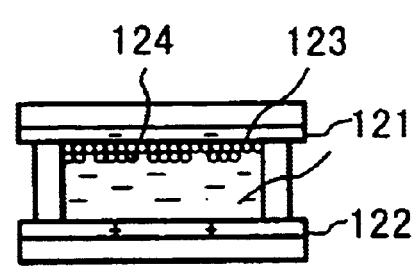
FIG. 1A   FIG. 1B
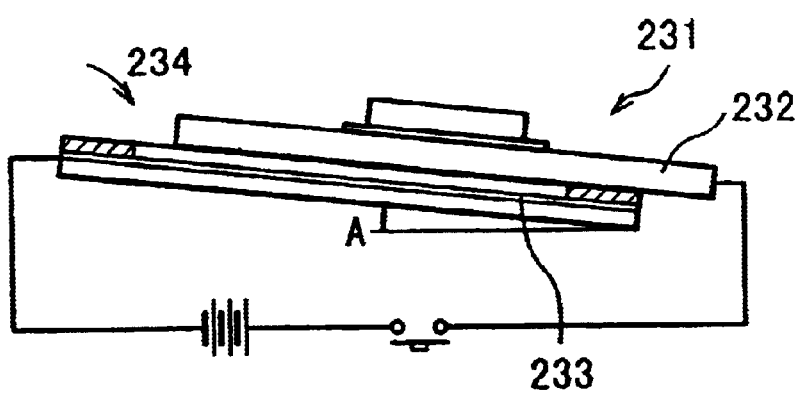
FIG. 2
(PRIOR ART)

APPARATUS AND PROCESS FOR PRODUCING ELECTROPHORETIC DEVICE

FIELD OF THE INVENTION AND RELATED ART

The present invention relates to an apparatus for producing an electrophoretic (display) device wherein electrophoretic particles are moved between electrodes to effect a display, and also a process for producing such an electrophoretic (display) device including a step of filling an electrophoretic device with an electrophoretic dispersion liquid containing charged (electro-)phoretic particles. More specifically, the present invention relates to a process for producing an electrophoretic device including a step of filling with charged phoretic particles a very small gap or spacing between a pair of substrates, of which at least one is provided with an electrode, of the electrophoretic device.

In recent years, accompanying the progress of data processing apparatus, there has been an increasing demand for a display device requiring a small power consumption and a small thickness, and extensive study and development have been made on devices satisfying such a demand. Among these, a liquid crystal display device wherein an alignment of liquid crystal molecules is electrically controlled to change optical characteristics has been extensively developed and commercialized as a display device satisfying the demand described above.

However, such liquid crystal display devices are still accompanied with problems of visual load on human eyes, such as difficulty of recognizing characters on display depending on a viewing angle or due to reflection light, and flickering and low luminance of light sources. Accordingly, extensive study is still made for new-types of display devices causing less visual load on human eyes.

Reflection-type display devices are expected from the viewpoints of lower power consumption and less visual load on human eyes. As a type thereof, an electrophoretic display device has been proposed by Harold D. Lees, et al. (U.S. Pat. No. 3,612,758). Electrophoretic display devices are also disclosed in, e.g., Japanese Laid-Open Patent Application (JP-A) 9-185087.

A structure and an operation of an electrophoretic display device are described with reference to FIGS. 1A and 1B. Referring to these figures, a display device 125 includes a dispersion layer comprising an insulating liquid 124 containing a colorant dissolved therein and charged electrophoretic or electrophoretically migrating particles 123 dispersed in the insulating liquid 124, and a pair of oppositely disposed electrodes 121 and 122 sandwiching the dispersion layer. When a voltage is applied across the dispersion layer via the electrodes 121 and 122, the colored electrophoretic particles 123 are attracted to an electrode of a polarity opposite to that of the charge of the particles 123. A display is performed by a combination of the color of the electrophoretic particles 123 and the color of the insulating liquid 124 having a different color from the electrophoretic particles 123 due to the colorant dissolved therein.

More specifically, when the first electrode 121 is made a negative electrode and the second electrode 122 is made a positive electrode, positively charged colored electrophoretic particles 123 are moved or migrated and attached to the surface of the first electrode 121 disposed closer to a viewer, thereby displaying the color of the particles 123 (FIG. 1B).

On the other hand, when the first electrode 121 is made a positive electrode and the second electrode 122 is made a negative electrode, the positively charged electrophoretic particles 123 are moved and attached to the surface of the second electrode farther from the viewer to display the color of colorant contained in the insulating layer 124 (FIG. 1A).

Recently, a new type of electrophoretic display device has been reported (JP-A 11-202804). In this electrophoretic display device, unlike a conventional one, charged phoretic particles are moved horizontally relative to the substrates to effect a display, and a pair of electrodes for driving the charged phoretic particles are formed in lamination on one substrate, so as to display a bright state or a dark state depending on a degree of spreading of phoretic particles corresponding to different areas of electrodes as viewed from a display surface. This system utilizes a degree of spreading of charged phoretic particles for display, so that a transparent dispersion liquid medium can be used. As a result, it becomes possible to relatively easily realize a color display by utilizing a color filter layer, etc. Further, the pair of electrodes are formed on one substrate, the positional alignment of the two electrodes and wiring thereto become easier.

The display quality of an electrophoretic display device substantially depends on the density of charged phoretic particles dispersed in the dispersion liquid, it is necessary to dispose the charged phoretic particles in dispersion uniformly over the entire display surface. As methods for dispersing charged phoretic particles in a conventional type electrophoretic display device, two methods as follows are known.

In a first one, a structure of two substrates being applied to each other with a certain gap therebetween is evacuated to a vacuum and is dipped in a dispersion liquid containing charged phoretic particles, followed by restoration to a normal pressure to inject the dispersion liquid into the gap (JP-A 11-38898).

In a second method, one substrate provided with one electrode is placed on a liquid container provided with a counter electrode, a suspension liquid containing charged phoretic particles dispersed therein is injected thereto, and the charged phoretic particles are attached onto the one electrode on the one substrate under application of an electric field. An apparatus therefor is illustrated in FIG. 2 (JP-A (Tokuhyo) 8-502599).

The method of JP-A 11-38898 may be satisfactory in the case of a large gap between the substrates, but at a smaller gap, the flow of charged phoretic particles is retarded compared with that of the dispersion liquid medium, so that the density of charged phoretic particles is liable to be higher at the injection port, and a uniform dispersion becomes difficult.

On the other hand, the method of JP-A 8-502599 uses an apparatus 231 as illustrated in FIG. 2 to allow attachment of charged phoretic particles contained in a dispersion, liquid 234 over an entire area of a substrate 232. In this method, the attached amount of charged phoretic particles substantially depends on a gap size between the electrode on the substrate 232 and an electrode 233 on the apparatus 231, the concentration distribution of charged phoretic particles becomes nonuniform if a flexible substrate 232 is used. Further, in this method, it is necessary to provide the apparatus with an electrode 233 having an area identical to that of the substrate 232, thus leaving problems regarding mass productivity and production cost.

An organization and an operation principle of another electrophoretic display device are described with reference to FIGS. 3A and 3B illustrating a cell structure thereof. The device includes a pair of electrodes 302 and 304 disposed opposite to each other so as to sandwich an electrophoretic dispersion liquid 308 colored with a colorant and containing charged phoretic particles 309 dispersed therein. At least one of the electrodes 302 and 304 is made transparent. The device also includes spacers 302 for keeping constant the gap between a pair of substrates 301 and 303 and dividing the gap into small sections (cells, only one being shown).

For driving, a voltage is applied across the dispersion liquid 308 between the electrodes 302 and 304 from a voltage application circuit 340, thereby attracting the charged phoretic particles 309 toward an electrode of a polarity opposite to that of the particles 309 per se. More specifically, as shown in FIGS. 3A and 3B, the display is performed based on a difference between the color of the charged phoretic particles 309 and the color of the dispersion liquid 308 containing a colorant having a color different from the charged phoretic particles 309 and dissolved therein. In the state shown in FIG. 3A, the color of the dispersion liquid 308 is seen to the viewer, and in the state of FIG. 3B, the color of the charged phoretic particles 309 is seen to the viewer.

The electrophoretic display device is prepared by first providing a first electrode-forming substrate 305 comprising a first substrate 301 and a first electrode 302 thereon, forming spacers 307 thereon, filling the dispersion liquid 308 containing the colorant dispersed therein, and applying thereonto a second electrode-forming substrate 306 comprising a second substrate 302 and a second electrode 304 formed thereon to seal the dispersion system.

FIG. 4 illustrates a method of filling a known electrophoretic display device, wherein prior to assembling a first electrode-forming substrate 435 and a second electrode-forming substrate (not shown) onto an electrophoretic display device, a first electrode-forming substrate 435 (or a second electrode forming substrate) is coated with charged phoretic particles and then the coated substrate 305 is assembled into a display device, and an electrophoretic dispersion liquid is filled into the device (JP-A 8-502599).

According to an embodiment, the application of the charged phoretic particles 436 onto the first electrode-forming substrate is performed in the following manner. On an affixing substrate 433 provided with an electrode 434 and a polyethylene terephthalate (PET) 438, a first electrode-forming substrate 435 is affixed so as to leave an opening 430, and a dispersion liquid 437 containing the charged phoretic particles 436 is injected through the opening 430. Simultaneously therewith, a voltage is applied between the electrode 434 on the affixing substrate 433 and the first electrode 432 of the first electrode-forming substrate 435 from a voltage supply 440 to move the charged phoretic particles 436 toward the first electrode-forming substrate 435, thereby coating the first electrode-forming substrate 435 with the charged phoretic particles 436. After the sufficient coating, the voltage is removed. Then, the coated first electrode-forming substrate 435 is assembled with a second electrode-forming substrate and then a dispersion liquid 437 is filled in the assembled device.

The above-mentioned method of filling the charged phoretic particles 436 and the dispersion liquid 437 is effective in the case where a very small gap is retained between a pair of substrates, and for the coating of one substrate with the charged phoretic particles 436, a precise control of the concentration thereof within the dispersion liquid 437 is not required.

However, in the step of coating the first (or second) electrode-forming electrode with the charged phoretic particles 436, the charged phoretic particles 436 are simply attracted to the first (or second) electrode-forming substrate by electrophoresis under application of a DC voltage, so that the charged phoretic particles 436 of the same polarity are gathered to proximity of the electrodes, and the charge distribution of the charged phoretic particles is not controlled.

In the case where the charge distribution of the charged phoretic particles 436 is not controlled, the charged phoretic particles 436 coating the first (or second) electrode forming substrate are in the form of a mixture of particles having large a charge and particles having a small charge. For driving such particles having a small charge, a high drive voltage is required because at a low voltage application, only a low display contrast can be attained. Thus, for allowing a lower voltage drive, a method of selectively using charged phoretic particles 436 having a high charge is required, and for attaining a high contrast, a method of selecting particles having a uniform change is required.

Further, the amount of the attached charged phoretic particles remarkably depends on a gap width between the electrode 432 formed on the first electrode-forming substrate 435 and the electrode 434 formed on the affixing substrate 433, the concentration distribution of charged phoretic particles becomes ununiform if a flexible substrate is used for the first (or second) electrode-forming substrate wherein it is difficult to maintain the gap between the electrodes 432 and 434 at constant over the extension of the first (or second) electrode-forming substrate 435.

An organization and an operation principle of another electrophoretic display device are described with reference to FIG. 5. Referring to FIG. 5, the device includes a first substrate 501, a first electrode 502, a second substrate 503, a second electrode 504, spacers 507, a liquid dispersion medium 508, electrophoretic particles 509 and a voltage application circuit 540.

More specifically, the device includes a dispersion system comprising a liquid dispersion medium 508 with a colorant dissolved therein and electrophoretic particles 509, a pair of a first substrate 501 and a second substrate 503 disposed opposite to each other so as to sandwich the dispersion system, and spacers 507 for retaining a prescribed gap between the substrates 501 and 503 and functioning as partitioning walls for dividing and confining the dispersion systems into small sections or cells (only two of which are illustrated). At least one of the first and second substrates 501 and 503 is made transparent.

For a display, a voltage is applied across the dispersion system between the first and second electrodes 502 and 504, whereby the electrophoretic particles 509 are attached toward either one of the electrodes 502 and 504 depending on the charged polarity of the electrophoretic particles 509. The display is performed based on a difference between the color of the electrophoretic particles 509 observed when the particles 509 are attracted to the second substrate 503 and the color of the dispersion liquid medium observed when the electrophoretic particles 509 are attracted to the first substrate 501.

For the production of the device, spacers 507 are formed on a first substrate 501 provided with a first electrode 502, a mixture of the colored liquid dispersion medium 508 and electrophoretic particles 509 are filled in the respective cells, and a second substrate 503 provided with a second electrode 504 is applied thereon to seal up the dispersion.

For the preparation of the above device, the method of JP-A 8-502599 may be again adopted. Thus, electrophoretic particles are first attained onto a first (or a second) substrate under application of a DC voltage as described. Then, the first (or a second) substrate to which the electrophoretic particles are attached, is assembled into an electrophoretic display device, followed by filling of the liquid dispersion medium. Thereafter, the attached electrophoretic particles on the first (or second) electrode are caused to diffuse between the first and second by electrophoresis under application of a voltage between the electrodes to form a uniform dispersion system.

The diffusion of attached electrophoretic particles relying on only the electrophoretic effect is accompanied with several problems.

The diffusion by the electrophoretic effect alone may require application of a large-voltage between the electrodes, which is liable to cause an electric insulation breakdown of the electrophoretic apparatus. In case where a TFT is adopted as a drive element, the applicable voltage is restricted by the withstand voltage of the TFT.

Another difficulty is that the electrophoretic particles are liable to cause agglomeration with each other in a step of attachment thereof onto one substrate prior to the diffusion step, so that the electrophoretic diffusion can cause separation of the electrophoretic particles from one substrate but the full disintegration of the agglomerated particles is difficult to be performed thereby.

As a result, the resultant electrophoretic display device is liable to be accompanied with difficulties, such as a lower resolution and a lower display contrast, attributable to localization of electrophoretic particles.

SUMMARY OF THE INVENTION

A generic object of the present invention is to provide a solution to the above-mentioned problems of the prior art methods of producing electrophoretic display devices.

A more specific object of the present invention is to provide an apparatus and a process for producing a high-quality electrophoretic (display) device wherein charged phoretic particles in a dispersion liquid are easily and evenly distributed to respective cells or pixels even in the case of a very small gap between two substrates or the case of using a flexible substrate.

Another object of the present invention is to provide an apparatus and a process for producing an electrophoretic (display) device wherein an electrophoretic dispersion liquid containing charged phoretic particles having an appropriate charge distribution is filled at an appropriate concentration distribution regardless of a gap size between a pair of substrates or a flexibility of a substrate.

A further object of the present invention is to provide an apparatus and a process for producing an electrophoretic (display) device wherein electrophoretic are distributed in a good diffusion state in the electrophoretic dispersion system.

According to the present invention, there is provided an apparatus for producing an electrophoretic (display) device comprising at least: charged phoretic particles, a dispersion liquid medium for dispersing the charged phoretic particles therein, and a pair of substrates including a substrate with electrodes formed thereon; said apparatus comprising: storage means for storing a dispersion liquid containing the charged phoretic particles dispersed therein, stirring means for stirring the dispersion liquid, substrate-holding means for holding the substrate in the dispersion liquid, and means for applying a voltage to the electrodes formed on the substrate thereby depositing the charged phoretic particles on the electrodes.

According to another aspect of the present invention, there is provided an apparatus for producing an electrophoretic (display) device comprising at least: charged phoretic particles, a dispersion liquid medium for dispersing the charged phoretic particles therein, and a pair of substrates including a substrate with electrodes formed thereon; said apparatus comprising: substrate-holding means for holding the substrate, means for applying a voltage to the electrodes formed on the substrate, and ejection means for ejecting a dispersion liquid containing the charged phoretic particles dispersed therein onto the electrodes on the substrate thereby depositing the charged phoretic particles on the substrate.

The present invention further provides a process for producing an electrophoretic (display) device comprising a pair of a first substrate and a second substrate, of which at least the first substrate is provided with a first electrode and a second electrode between which a voltage can be applied, and a dispersion liquid disposed between the first and second electrodes and comprising a dispersion liquid medium and charged phoretic particles dispersion therein; said process comprising:

a first step of depositing the charged phoretic particles on the first substrate, a second step of pouring the dispersion liquid medium over the charged phoretic particles on the first substrate to form the dispersion liquid, and a third step of sealing the dispersion liquid between the first substrate and the second substrate.

The present invention further provides a process for producing an electrophoretic (display) device comprising a pair of a first substrate and a second substrate, of which at least the first substrate is provided with first and second electrodes and a dispersion liquid disposed between the first and second electrodes and comprising a dispersion liquid medium and charged phoretic particles dispersion therein; said process comprising:

a first step of depositing the charged phoretic particles on an electrode-provided surface of the first substrate, a second step of washing the electrode-provided surface of the first substrate carrying the deposited charged phoretic particles thereon with the dispersion liquid medium alone or in mixture with the charged phoretic particles, a third step of pouring the dispersion liquid medium over the electrode-provided surface of the first substrate to form the dispersion liquid on the first substrate, and a fourth step of sealing the dispersion liquid between the first substrate and the second substrate.

There is also provided a process for producing a display device comprising a pair of substrates including at least one transparent substrate, a spacer for defining a gap between the substrates, a dispersion liquid comprising a dispersion liquid medium and charged phoretic particles dispersed therein and disposed between the substrates so as to fill the gap, and a pair of electrodes for applying a voltage to the dispersion liquid, so as to move the charged phoretic particles in the dispersion liquid to effect a display, said process including: a sealing step of sealing the dispersion liquid between the substrates to form a filled device, and a vibration step of applying a vibration from outside to the filled device so as to diffuse the charged phoretic particles in the dispersion liquid sealed between the substrates.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B, FIGS. 3A and 3B, and FIG. 5, are schematic sectional views for illustrating an organization and an operation principle of a known electrophoretic display device.

FIGS. 2 and 4 illustrate a step of attaching electrophoretic particles onto one of two substrates for forming an electrophoretic device according to a known method.

DESCRIPTION OF THE PREFERRED EMBODIMENTS (First Embodiment)

Figure 6:
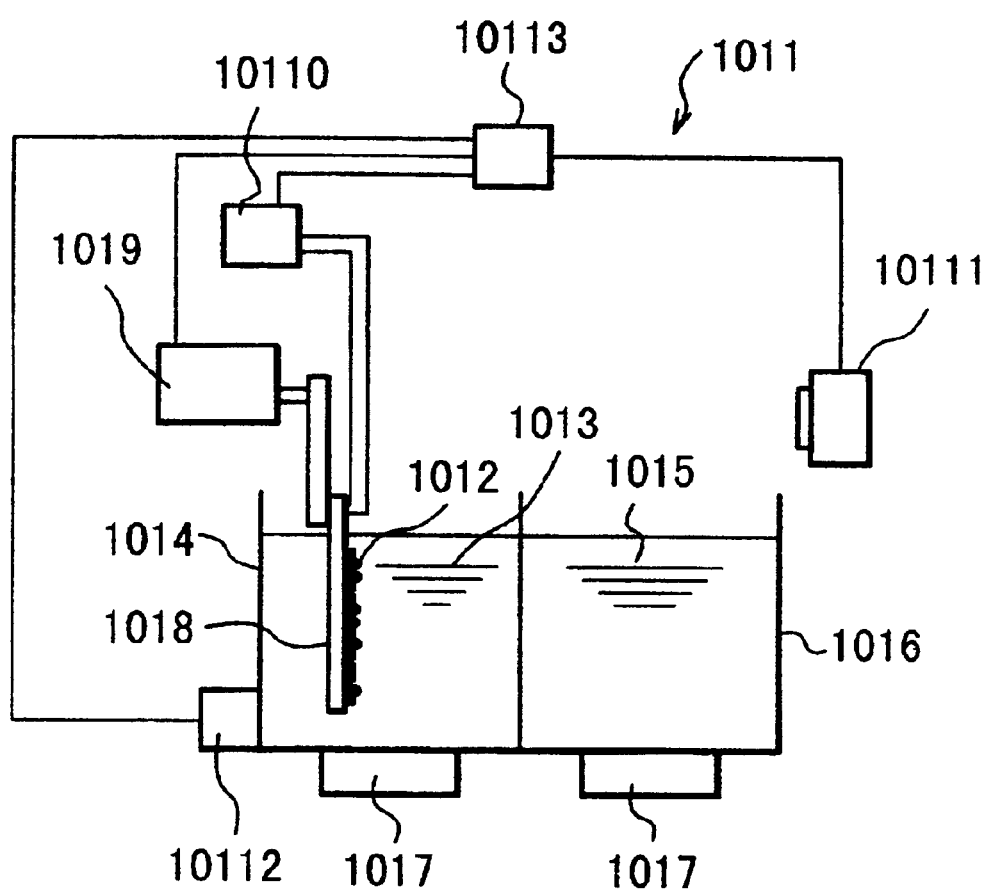
FIGS. 6–8 are respectively a schematic illustration of a system for producing an electrophoretic display device according to the invention.

FIG. 6 is a schematic illustration (partly in section) of an embodiment of the apparatus for producing an electrophoretic display device according to the present invention. Referring to FIG. 6, an apparatus 1011 includes a first vessel 1014 as a storage means for holding a dispersion liquid 1013 containing charged phoretic particles 1012 dispersed therein; a second vessel for holding a dispersion liquid medium 1015 not containing such charged phoretic particles 1012; stirring means 1017 for stirring the dispersion liquid (medium) 1013 and 1015; a substrate-holding means 1019 for holding a substrate 1018; and a voltage application means 10110 for applying a voltage to an electrode formed on the substrate 1018.

It is further preferred for the substrate-holding means 1019 to have functions of conveying and vibrating the substrate 1018. The apparatus 1011 further includes a first concentration detection means 10111 for detecting the concentration of charged phoretic particles 1012 collected on the electrode, a second concentration detection means 10112 for detecting the concentration of the charged phoretic particles in the dispersion liquid 1013, and a control means 10113 for controlling these means inclusively.

The first and second vessels 1014 and 1016 may be formed of any materials inclusive of glass, various resins and metals, as far as they are free from liberation of impurities adversely affecting the charged phoretic particles 1012 and the dispersion liquid 1013.

The stirring means 1017 may be of any type as far as it is suitable for stirring of liquids. An internal stirring means, such as a stirring blade or a magnetic stirrer, may be used, but circulation by a liquid feed pump can also be used.

The substrate-holding means 1019 is used for surely holding the substrate 1018 and may preferably have a function of conveying the substrate 1018. It is further preferred that the substrate-holding means 1019 also has a function of vibrating or repetitively moving the substrate 1018 relative to the dispersion liquid 1013. The repetitive movement (vibration) may be performed in various directions, such as back and forth (perpendicularly to the drawing), laterally, up and down (vertically) and in rotation or swing. A sheet or plural sheets of the substrate 1018 may be held at a time by the substrate-holding means 1019.

The substrate 1018 may be formed of glass or a thick plastic sheet, or also a thin film of plastic materials, such as polyethylene terephthalate, polyimide, polycarbonate or polyphenylene sulfide, of at most several tens $\mu$m in thickness. Such a thin and flexible film substrate can be used since the application of the charged phoretic particle onto the substrate does not require a counter electrode, thus without being substantially affected by a gap between the substrates.

The voltage application means 10110 is used to apply a voltage of, e.g., up to 200 volts, to electrodes formed on the substrate 1018. An AC voltage or a DC voltage may be applied between each pair of electrodes, but an AC voltage is preferred. A frequency of ca. 0.1–10 Hz may be used while it is not particularly restrictive. Any voltage waveform may be used, and voltage application conditions inclusive of a voltage amplitude, a frequency and a voltage waveform, may be varied so as to facilitate the control of deposition rate of charged phoretic particles on the substrate.

The density of the charged phoretic particles on the electrodes on the substrate 1018 may be detected by the optical density detection means 10111 in the manner of detecting an optical density while driving the charged phoretic particles 1012 by applying an AC voltage to the electrodes on the substrate 1018. Any detection method capable of measuring an optical density may be used.

The density detection means 10112 for detecting the density of charged phoretic particles 1012 in the dispersion liquid 1013 is provided to the first vessel 1014, thereby detecting the density of charged phoretic particles in the dispersion liquid 1013 lowered by deposition thereof onto the substrate 1012. The detection may be performed according to any method capable of detecting a density. The detection means can also be provided to the second vessel 1016.

As the control means 10113 for inclusively controlling the above-mentioned means, a personal computer, etc., may be used, so as to control the holding, conveyance and vibration (movement) of the substrate, the control of the voltage application conditions, the detection and correction of the concentration of charged phoretic particles, etc., for accomplishing desired deposition of charged phoretic particles on the electrodes.

An electrophoretic display device may be prepared by using the above-mentioned production apparatus in the following manner.

The first vessel 1014 is filled with a dispersion liquid 1013 containing charged phoretic particles dispersed therein. The second vessel 1016 is filled with a dispersion liquid medium containing no charged phoretic particles. A substrate 1018 prepared according to, e.g., the method of JP-A 11-202804 is caused to be held by the substrate-holding means 1019. The substrate 1018 is provided with pairs of electrodes disposed in lamination for each pair and is dipped in the dispersion liquid 1013 in the first vessel after connecting the electrodes to the voltage application circuit 10110. (Regarding a process for a detailed process for producing an electrode plate or sheet 3010 having a superposed structure including two types of electrodes 3011 and 3012 disposed in lamination, the disclosure of JP-A 11-202804 is incorporated herein by reference.) Then, a voltage, preferably an AC voltage, is applied between each pair of the electrodes. During the voltage application, the dispersion liquid 1013 in the first vessel 1014 is moved relative to the substrate 1018 by the substrate-holding means 1019 or the solution stirring means 1017, so as to continuously supply a fresh portion of the dispersion liquid 1013 to the electrodes on the substrate. After deposition of a sufficient amount of charged phoretic particles 1012 on the electrodes of the substrate 1018, the substrate 1018 while being continually supplied with the voltage is conveyed and dipped in the dispersion liquid medium 1015 in the second vessel 1016 (with continued application of the AC voltage) to remove an excessive or an insufficiently charged portion of the charged phoretic particles. As a result to of this operation, the charged phoretic particles having uniform properties can be uniformly distributed over the electrodes (and to respective cells each having the pair of electrodes). Then, the substrate 1018 is dipped out of the dispersion liquid 1015 to measure a density contrast (given by a state of spreading and a state of localization of charged phoretic particles giving two display states) on the electrodes by the first density detection means 10111. If the measured density contrast is sufficient, the treatment operation for the substrate is finished, and the above-mentioned operation is started for a subsequent (batch of) substrate(s), and the treated substrate is subjected to a subsequent step of display device preparation, such as application of a second substrate. More specifically, the treated substrate may be subjected to the addition of the dispersion liquid medium, the application of and sealing with the second or display surface-side substrate, and the disposition of and connection with an electrical circuit for completing an electrophoretic display device.

If the density contrast or uniformity thereof is judge to be insufficient for the above-treated substrate, the above-mentioned steps of attachment of charged phoretic particles and removal of non-uniformly attached charged phoretic particles can be repeated several times.

A specific production example is described hereinbelow.

EXAMPLE 1-1

An electrophoretic display device was prepared by using an apparatus according to the present invention as shown in FIG. 1.

A dispersion liquid 1013 was prepared by dispersing ca. 1–2 $\mu$m-dia. black charged phoretic particles and a charge control agent in a dispersion liquid medium comprising principally aliphatic hydrocarbons ("ISOPER" (trade name), made by Exxon Co.) and placed in a first vessel 1014. As positive charge control agents, it is possible to use a naphthenic acid salt of a metal, such as cobalt, manganese or iron, zirconium octenate, etc. and as negative control agents, it is possible to use lecithin, calcium petroleum-sulfonate, calcium alkylbenzene-sulfonate, sodium dioctylsulfonate, alkylalanine, etc. Such a charge control agent can also be incorporated in (charged) phoretic particles.

Then, a dispersion liquid medium 1015 (identical to the above) not containing charged phoretic particles was placed in a second vessel 1016. The liquids within the first and second vessels 1014 and 1016 were respectively stirred gently by magnetic stirrers 1017. A substrate 1018 of PET (polyethylene terephthalate film) with sizes of 300 mm-L, 200 mm-W and 120 $\mu$m-T provided with pairs of electrodes and also provided with 30 $\mu$m-high and 15 $\mu$m-wide spacers (not shown) formed by photolithography, was held by a substrate-holding means 1019 and the electrodes were connected to a voltage application circuit 10110 so as to apply a rectangular AC voltage of ±80 volts at a frequency of 1 Hz between the electrodes in each pair. The substrate 1018 was then dipped in the dispersion liquid 1013 in the first vessel 1014, and was held therein for 10 min. while being swung back and forth by the substrate-holding means 119, thereby depositing charged phoretic particles 1012 on the electrodes. During the deposition step, the concentrations of charged phoretic particles in the first vessel 1014 was continually measured by a second concentration detection means 10112. After the deposition of the charged phoretic particles 1012, the substrate 1018 was transferred onto the second vessel 1016 while continuing the voltage supply to the electrodes. The voltage application was continued for 5 min. within the second vessel 1016 for smoothing the charged phoretic particles 1012 on the electrodes of the substrate 1018.

Then, the substrate 1018 was pulled up from the second vessel 1016 to check the concentration of the charged phoretic particles 1012 on the electrodes. As a result, the charged phoretic particles on the electrodes exhibited a sufficient contrast, so that the step of deposition of charged phoretic particles was finished.

The above steps were all performed under a control of the control means 10113. After the charged phoretic particle-deposition step, post treatments were performed, such as the supplement of the dispersion liquid medium, the application of another transparent substrate of also PET onto the above-treated substrate to seal up the dispersion liquid within a gap of 30 $\mu$m given by the spacers, and the connection of the electrodes to an electrical circuit, to complete an electrophoretic device. The thus-prepared electrophoretic display device comprised a matrix of rectangular cells of 30 mm×20 mm each defined by a surrounding wall of spacer and comprising 30 $\mu$m-side (and 30 mm-long) stripes of 160 first electrodes (black) arranged at a pitch of 125 $\mu$m and a 30 mm×20 mm-second electrode (white) disposed below the first electrodes, over an entire display area of 300 mm×200 mm.

As a result of drive of the thus-prepared electrophoretic display device by applying voltages of ±40 volts alternately to the first and second electrodes, the device exhibited a very uniform contrast distribution over the entire display area extension regardless of a very small gap of 30 $\mu$m.

As described above, by using a production apparatus of the present invention, it is possible to uniformly distribute charged phoretic particles of a display dispersion liquid to respective display cells easily and evenly even in the case of a small gap between two substrates or the case of using flexible substrate, thereby allowing the production of a high-quality electrophoretic display device. Further, as the production apparatus does not include a counter electrode, the apparatus is advantageous than the conventional apparatus in respects of mass productivity and production cost.

(Second Embodiment)

Figure 7:
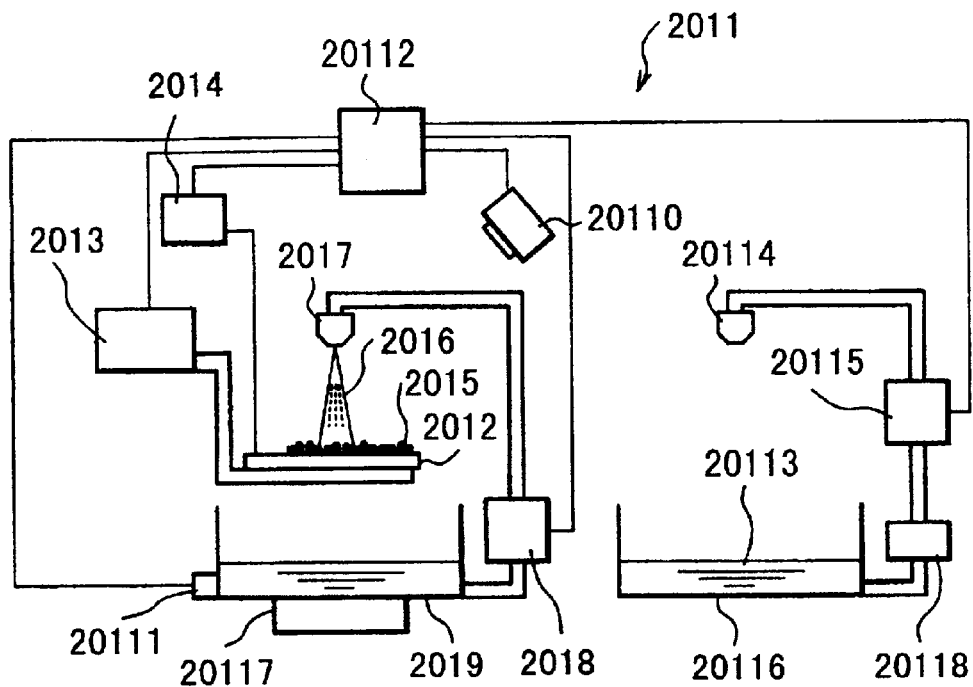

FIG. 7 is a schematic illustration (partly in section) of an embodiment of the apparatus for producing an electrophoretic display device of the present invention. Referring to FIG. 7, an apparatus 2011 includes a substrate-holding means 2013 for holding a substrate 2012 with electrodes formed thereon, a voltage application means 2014 for applying a voltage to the electrodes formed on the substrate 2012, a nozzle 2017 as a means for ejecting a dispersion liquid 2016 containing charged phoretic particles 2015 dispersed therein, and a pump 2018 for supplying the dispersion liquid 2016 to the nozzle 2017. The apparatus 2011 further includes a first vessel 2019 for storing the dispersion liquid 2016 to be ejected and receiving an excess of the ejected dispersion liquid 2016, an optical density detection means 20110 for detecting the density of the charged phoretic particles 2015 deposited on the electrodes, a density detection means 20111 for measuring the concentration of charged phoretic particles 2015 in the dispersion liquid 2016 in the first vessel 2019, and control means 20112 for inclusively controlling the above means. The substrate-holding means 2013 also has functions of conveying the substrate 2012 to the position above the first vessel 2019 and causing a repetitive movement (vibration, swinging, reciprocation, rotation, etc.) of the substrate 2012 above the first vessel 2019. The apparatus 2011 can further include a nozzle 20114 for spraying or ejecting a dispersion liquid 20113 not containing or containing only a low concentration of charged phoretic particles and a pump 20115 therefor, a second vessel 20116 for supplying the dispersion liquid 20113 to be sprayed or recovering the ejected dispersion liquid 20113. The first and second vessels 2019 and 20116 can be equipped with a stirring means 20117.

The first and second vessels 2019 and 20116 may be formed of any materials inclusive of glass, various resins and metals, as far as they are free from liberation of impurities adversely affecting the charged phoretic particles 2015 and the dispersion liquid 2016 and 20113.

The substrate-holding means 2013 is used for surely holding the substrate 2012 and may preferably have a function of conveying the substrate 2012. It is further preferred that the substrate-holding means 2013 also has a function of vibrating or repetitively moving the substrate 2012 above the first vessel 2019. The repetitive movement (vibration) may be performed in various directions, such as back and forth (perpendicularly to the drawing), laterally, up and down (vertically) and in rotation or swing. A sheet or plural sheets of the substrate 2012 may be held at a time by the substrate-holding means 2013. During the ejection of the dispersion liquid 2016, the substrate 2012 may be held horizontally (as shown), vertically or obliquely.

The substrate 2012 may be formed of glass or a thick plastic sheet, or also a thin film of plastic materials, such as polyethylene terephthalate, polyimide, polycarbonate or polyphenylene sulfide, of at most several tens $\mu$m in thickness. Such a thin and flexible film substrate can be used since the application of the charged phoretic particle onto the substrate does not require a counter electrode, thus without being substantially affected by a gap between the substrates.

The voltage application means 2014 is used to apply a voltage of, e.g., up to 300 volts, to electrodes formed on the substrate 2012. An AC voltage or a DC voltage may be applied between each pair of electrodes, but an AC voltage is preferred. A frequency of ca. 0.01–50 Hz may be used while it is not particularly restrictive. Any voltage waveform may be used, and voltage application conditions inclusive of a voltage amplitude, a frequency and a voltage waveform, may be varied so as to facilitate the control of deposition rate of charged phoretic particles on the substrate.

The density of the charged phoretic particles 2015 on the electrodes on the substrate 2012 may be detected by the optical density detection means 20110 in the manner of detecting an optical density while driving the charged phoretic particles 2015 by applying an AC voltage to the electrodes on the substrate 2012. Any detection method capable of measuring an optical density may be used.

The density detection means 20111 for detecting the density of charged phoretic particles 2015 in the dispersion liquid 2016 is provided to the first vessel 2019, thereby detecting the density of charged phoretic particles in the dispersion liquid 2016 lowered by deposition thereof onto the substrate 2012. The detection may be performed according to any method capable of detecting a density. The detection means can also be provided to the second vessel 20116.

The stirring means 1017 may be of any type as far as it is suitable for stirring of liquids. An internal stirring means, such as a stirring blade or a magnetic stirrer, may be used, but circulation by a liquid feed pump can also be used.

The second vessel 20116 may preferably be provided with a filter 20118 for removing charged phoretic particles.

As the control means 20112 for inclusively controlling the above-mentioned means, a personal computer, etc., may be used, so as to control the holding, conveyance and vibration (repetitive movement) of the substrate, the control of the voltage application conditions, the detection and correction of the concentration of charged phoretic particles, etc., for accomplishing desired deposition of charged phoretic particles on the electrodes.

An electrophoretic display device may be prepared by using the above-mentioned production apparatus in the following manner.

The first vessel 2019 is filled with a dispersion liquid 2016 containing charged phoretic particles dispersed therein. The second vessel 20116 may be filled with a dispersion liquid medium containing no charged phoretic particles. A substrate 2012 prepared according to, e.g., the method of JP-A 11-202804 is caused to be held by the substrate-holding means 2013. The substrate 2012 is provided with pairs of electrodes disposed in lamination for each pair and is disposed above the first vessel 2019 after connecting the electrodes to the voltage application circuit 2014. Then, a voltage, preferably an AC voltage, is applied between each pair of the electrodes.

Then, the dispersion liquid 2016 containing charged phoretic particles dispersed therein is ejected out of the nozzle 2017 while scanningly move the nozzle 2017 relative to the substrate 2012, so as to have the dispersion liquid always flow over the electrodes on the substrate 2012 and always supply a fresh portion of the dispersion liquid 2016.

Figure 8:
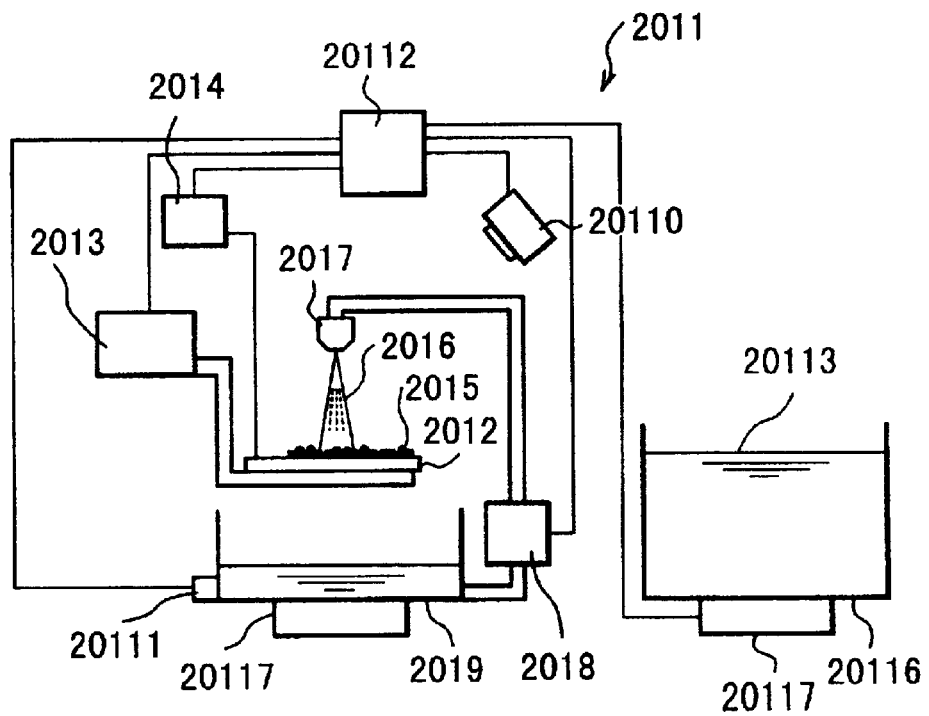

After deposition of a sufficient amount charged phoretic particles 2015 on the electrodes of the substrate 2012, the substrate 2012 while being continually supplied with the voltage is conveyed to above the second vessel 20116, and a dispersion liquid 20113 not containing charged phoretic particles or containing a sufficiently low concentration of charged phoretic particles is ejected out of the nozzle 20114 while scanningly move the nozzle 20114 relative to the substrate 2012. As a result of this operation, an excessive amount of charged phoretic particles and/or an insufficiently charged portion of charged phoretic particles on the substrate are removed to realize a uniform distribution of charged phoretic particles having uniformized properties over the electrodes (and to respective cells each having a pair of electrodes). Alternatively, this smoothing treatment can also be performed by directly dipping the substrate 2012 after the charged phoretic particle-deposition treatment above the first vessel 2019 into the dispersion liquid 20113 in the second vessel 20116. In this case, it is preferred to effect an appropriate degree of stirring of the dispersion liquid 20113 in the second vessel by a stirring means 20117 provided to the second vessel 20116, as illustrated in FIG. 8.

Then, the substrate 2012 is subjected to measurement of the density contrast on the electrodes by the optical density measurement means 20110. If the measured density contrast is sufficient, the treatment operation for the substrate is finished, and the above-mentioned operated is started for a subsequent (batch of) substrate(s), and the treated substrate is subjected to a subsequent step of display device preparation, such as application of a second substrate. More specifically, the treated substrate may be subjected to the addition of the dispersion liquid medium, the application of and sealing with the second or display surface-side substrate, and the disposition of and connection with an electrical circuit for completing an electrophoretic display device.

If the density contrast or uniformity thereof is judge to be insufficient for the above-treated substrate, the above-mentioned steps of attachment of charged phoretic particles and removal of non-uniformly attached charged phoretic particles can be repeated several times.

Some specific production examples are described hereinbelow.

EXAMPLE 2-1

An electrophoretic display device was prepared by using an apparatus according to the present invention as shown in FIG. 7.

A dispersion liquid 2016 was prepared by dispersing ca. 1–2 $\mu$m-dia. black charged phoretic particles and a charge control agent in a dispersion liquid medium comprising principally aliphatic hydrocarbons ("ISOPER" (trade name), made by Exxon Co.) and placed in a first vessel 2019.

Then, a dispersion liquid medium 20113 (identical to the above) not containing charged phoretic particles was placed in a second vessel 20116. The liquids within the first and second vessels 2019 and 20116 were respectively stirred by magnetic stirrers. A PET-substrate 2012 of 300 mm-L, 200 m-W and 120 $\mu$m-T provided with pairs of electrodes was held by a substrate-holding means 2013 and the electrodes were connected to a voltage application circuit 2014 so as to apply a rectangular AC voltage of ±8 volts at a frequency of 1 Hz between the electrodes in each pair.

Onto the substrate 2012 thus disposed above the first vessel 2019, the dispersion liquid 2016 containing charged phoretic particles dispersed therein were ejected for 2 min. out of the nozzle 2017 while scanningly move the nozzle 2017 relative to the substrate 2012, thereby depositing charged phoretic particles 2015 on the substrate 2012.

During the deposition step, the concentration of charged phoretic particles in the first vessel 2019 was continually measured by a concentration detection means 20111. After the deposition of the charged phoretic particles 2015, the substrate 2012 was moved to above the second vessel 20116 while continuing the voltage supply to the electrodes. In this state, the dispersion liquid medium 20113 containing no charged phoretic particles was ejected out of the nozzle 20114 for 3 min. while scanningly move the nozzle 20114 relative to the substrate 2012, thereby removing an excessive portion and/or an insufficiently charged portion of the charged phoretic particles 2015 on the substrate 2012 to uniformly distribute the charged phoretic particles having uniform properties over the electrodes (and thus to respective cells for display). During the ejection through the nozzle, the charged phoretic particles in the dispersion liquid 20113 in the second vessel 20116 were removed by passing through the filter 20118.

Then, the density of the charged phoretic particles deposited on the substrates was detected by the optical detection means 20110. As a result, the charged phoretic particles on the electrodes exhibited a sufficient contrast, so that the step of deposition of charged phoretic particles was finished.

The above steps were all performed under a control of the control means 20112. After the charged phoretic particle-deposition step, as post treatments, the dispersion liquid medium was supplementary added, the dispersion liquid was sealed up by application of a display-side substrate while leaving a gap of 30 $\mu$m, and the electrodes were connected to an electrical circuit to complete an electrophoretic display device.

As a result of drive of the thus-prepared electrophoretic display device, the device exhibited a very uniform contrast distribution over the planar extension regardless of a very small gap of 30 $\mu$m.

EXAMPLE 2-2

An electrophoretic display device was prepared by again using an apparatus according to the present invention as shown in FIG. 7.

A dispersion liquid 2016 was prepared by dispersing ca. 1–2 $\mu$m-dia. black charged phoretic particles and a charge control agent in a dispersion liquid medium comprising principally aliphatic hydrocarbons ("ISOPER" (trade name), made by Exxon Co.) and placed in a first vessel 2019.

Then, a dispersion liquid medium 20113 (identical to the above) not containing charged phoretic particles was placed in a second vessel 20116. The liquids within the first and second vessels 2019 and 20116 were respectively stirred by magnetic stirrers. A PET-substrate identical to the one used in Example 2-1 and provided with pairs of electrodes was held by a substrate-holding means 2013 and the electrodes were connected to a voltage application circuit 2014 so as to apply a rectangular AC voltage of ±80 volts at a frequency of 1 Hz between the electrodes in each pair.

Onto the substrate 2012 thus disposed above the first vessel 2019, the dispersion liquid 2016 containing charged phoretic particles dispersed therein were ejected for 1 min. out of the nozzle 2017 while scanningly move the nozzle 2017 relative to the substrate 2012, thereby depositing charged phoretic particles 2015 on the substrate 2012.

During the deposition step, the concentration of charged phoretic particles in the first vessel 2019 was continually measured by a concentration detection means 20111. After the deposition of the charged phoretic particles 2015, the substrate 2012 was moved to above the second vessel 20116 while continuing the voltage supply to the electrodes. In this state, the dispersion liquid medium 20113 containing no charged phoretic particles was ejected to of the nozzle 20114 for 2 min. while scanningly move the nozzle 20114 relative to the substrate 2012, thereby removing an excessive portion and/or an insufficiently charged portion of the charged phoretic particles 2015 on the substrate 2012 to uniformly distribute the charged phoretic particles having uniform properties over the electrodes (and thus to respective cells for display). During the ejection through the nozzle, the charged phoretic particles in the dispersion liquid 20113 in the second vessel 20116 was removed by passing through the filter 20118.

Then, the density of the charged phoretic particles deposited on the substrates was detected by the optical detection means 20110. As a result, the charged phoretic particles on the electrodes exhibited a sufficient contrast, so that the step of deposition of charged phoretic particles was finished.

The above steps were all performed under a control of the control means 20112. After the charged phoretic particle-deposition step, another transparent substrate was applied onto the above-treated substrate so as to sandwich the charged phoretic particles and the dispersion liquid medium therebetween while leaving a gap of 30 μm between the substrates as in Example 2-1 to complete an electrophoretic display device.

As a result of drive of the thus-prepared electrophoretic display device, the device exhibited a very uniform contrast distribution over the planar extension regardless of a very small gap.

EXAMPLE 2-3

An electrophoretic display device was prepared by using an apparatus as shown in FIG. 8.

The deposition of charged phoretic particles 2015 onto a substrate 2012 was performed above a first vessel 2019 in the same manner as in Example 2-1.

Then, the substrate 2012 was then transferred to a second vessel 20116 and dipped into a dispersion liquid 20113 contained therein under mild stirring while continuing the voltage application to the electrodes on the substrate 2012. The dipping was continued for 3 min. under continued voltage application, thereby removing an excessive portion and/or an insufficiently charged portion of the charged phoretic particles 2015 on the substrate 2012 to uniformly distribute the charged phoretic particles having uniform properties over the electrodes (and thus to respective cells for display).

Then, the substrate 2012 was pulled up from the second vessel 20116 and the density of the charged phoretic particles deposited on the substrates was detected by the optical detection means 20110. As a result, the charged phoretic particles 2015 on the electrodes. As a result, the charged phoretic particles on the electrodes exhibited a sufficient contrast, so that the step of deposition of charged phoretic particles was finished.

The above steps were all performed under a control of the control means 20112. After the charged phoretic particle-deposition step, as post treatments, the dispersion liquid medium was supplementary added, the dispersion liquid was sealed up by application of a display-side substrate while leaving a gap of 30 μm, and the electrodes were connected to an electrical circuit to complete an electrophoretic display device.

As a result of drive of the thus-prepared electrophoretic display device, the device exhibited a very uniform contrast distribution over the planar extension regardless of the very small gap.

As described above, according to Second embodiment of the production apparatus of the present invention, it is possible to uniformly distribute charged phoretic particles of a display dispersion liquid to respective display cells easily and evenly even in the case of a small gap between two substrates or the case of using flexible substrate, thereby allowing the production of a high-quality electrophoretic display device. Further, as the production apparatus does not include a counter electrode, the apparatus is advantageous than the conventional apparatus in respects of mass productivity and production cost.

(Third Embodiment)

According to an embodiment, the process for producing an electrophoretic display device comprises sequential steps including a first step of exposing a substrate equipped with electrodes formed thereon to a dispersion liquid containing charged phoretic particles dispersed therein while applying a voltage to the electrodes to coat the electrodes with the charged phoretic particles, a second step of disposing a dispersion liquid medium over the coated electrodes on the substrate, and a third step of assembling the substrate with another substrate to seal up a dispersion liquid comprising the charged phoretic particles and the dispersion liquid medium.

The respective steps are described in more details with reference to FIGS. 9–18, wherein only one cell section (display section) is shown for convenience of illustration, but such a cell may generally be arranged two-dimensionally to form an entire display device. In the process, a substrate (an electrode sheet) provided with first electrodes and a second electrode as formed by the method of JP-A 11-202804 may be used for preparing an electrophoretic display device. A functionally equivalent electrode sheet may also be used.

Such an electrode sheet can be formed from a substrate of a flexible material, such as polyethylene terephthalate (PET) or polyether sulfone (PES).

Figure 9:
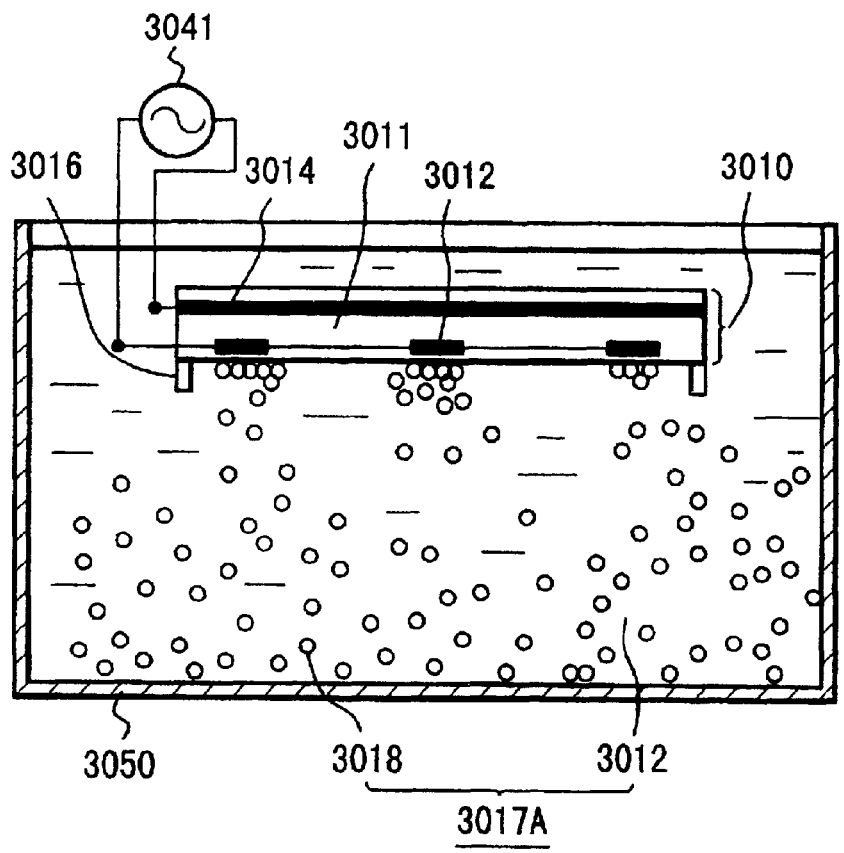
FIGS. 9–15 are schematic views each illustrating a step involved in a process for producing an electrophoretic display device according to the invention.
Figure 10:
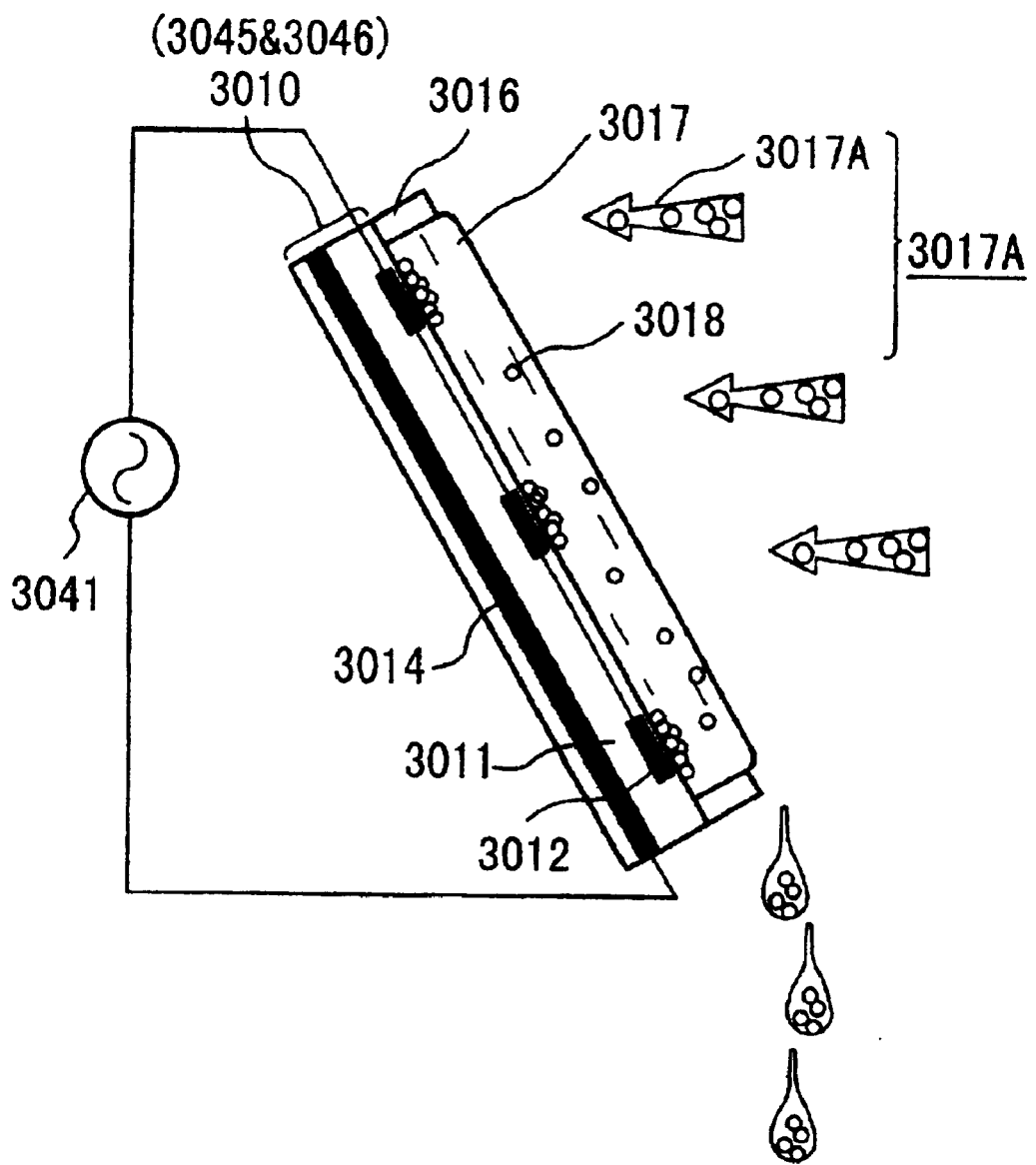

FIGS. 9 and 10 illustrate the above-mentioned first step. Referring to these figures, an electrode sheet 3010 provided with first electrodes 3012 and a second electrode 3014 is exposed to a dispersion liquid comprising a dispersion liquid medium 3017 and charged phoretic particles 3018 dispersed therein, and in this state, a periodically varying voltage is applied between the first electrodes 3012 and the second electrodes 3014 from a voltage application circuit 4013, whereby the charged phoretic particles 3018 disposed in the dispersion liquid medium 3017 are moved toward the first electrodes 3012 or the second electrode 3014. When the voltage application is continued for a certain period, the charged phoretic particles 3018 collected on the first electrodes 3012 or the second electrodes 3014 reach a prescribed concentration. By appropriately controlling the period, a desired concentration of the charged phoretic particles 3018 can be obtained. Further, by appropriately regulating the applied voltage, the charged phoretic particles 3018 may be provided with a desired charge distribution.

Figure 11:
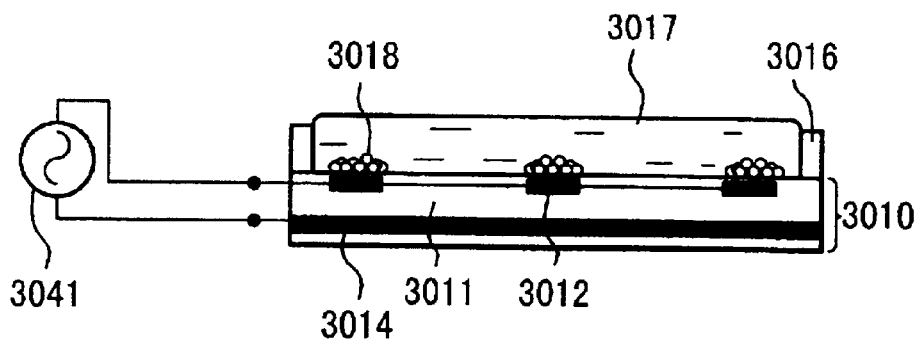

Finally, as shown in FIG. 11, a dispersion liquid comprising a dispersion liquid medium 3017 and charged phoretic particles 3018 contained therein at appropriate concentration and charge distribution is disposed on the electrode sheet 3010 provided with a spacer 3016. In this instance, it is preferred that the dispersion liquid medium 3017 also contains a charge control agent (not specifically shown).

The charge control agent may be a positive charge control agent or a negative charge control agent. As positive charge control agents, it is possible to use a naphthenic acid salt of a metal, such as cobalt, manganese or iron, zirconium octenate, etc. and as negative control agents, it is possible to use lecithin, calcium petroleum-sulfonate, calcium alkylbenzene-sulfonate, sodium dioctylsulfonate, alkylalanine, etc. Such a charge control agent can also be incorporated in phoretic particles.

Figure 12:
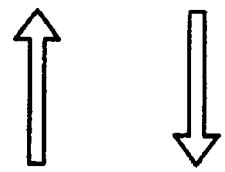
Figure 12:
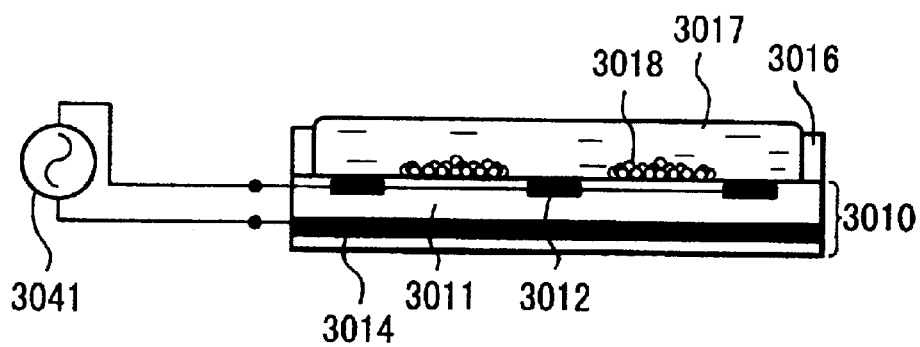

When a structure shown in FIG. 11 is subjected to application of a periodically varying voltage between the first electrodes 3012 and the second electrode 3014 from the voltage application circuit 3041, the charged phoretic particles 3018 are moved periodically between a state shown in FIG. 11 and a state shown in FIG. 12 according to electrophoresis, i.e., a state where the charged phoretic particles 3018 are collected above the first electrodes (FIG. 11) or a state where the charged phoretic particles 3018 are moved to a place above the second electrode 3014 not covered with the first electrodes 3012 (FIG. 12). The application voltage may have an amplitude up to 300 volts and a frequency of 0.01–50 Hz. Further, any voltage waveform may be used.

The charged phoretic particles 3018 in the dispersion liquid medium 3017 are generally charged to an identical polarity. However, in a case where some portion of phoretic particles are charged to an opposite polarity, such an oppositely charged portion of charged phoretic particles may preferably be removed, e.g., by electrophoresis, in advance of the first step of deposition of the charged phoretic particles 3018 described with reference to FIGS. 9 and 10.

Figure 13:
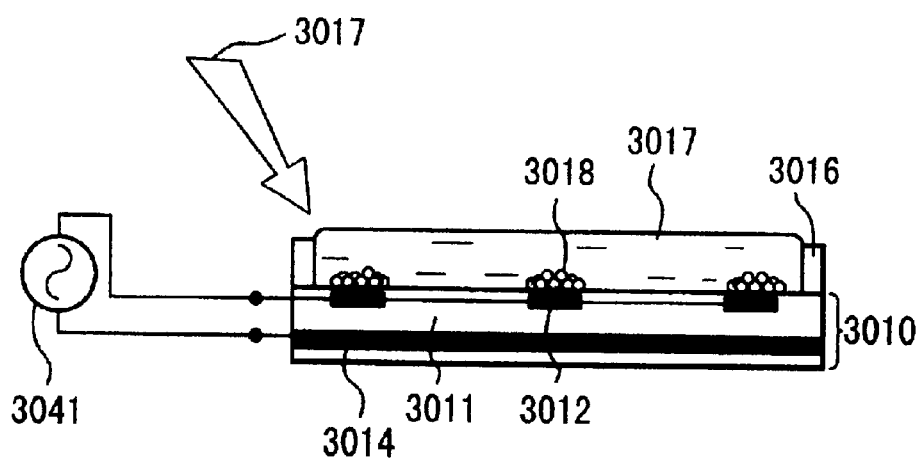

FIG. 13 illustrates the above-mentioned second step. Usually, the electrode sheet 3010 after the first step is short of the dispersion liquid medium 3017. In such a case or a case where an excess of dispersion liquid medium 3017 is preferred, the dispersion liquid medium 3017 may be gradually disposed or supplemented over the electrodes on the electrode sheet 3010 while applying an AC voltage (or a DC voltage).

Figure 14:
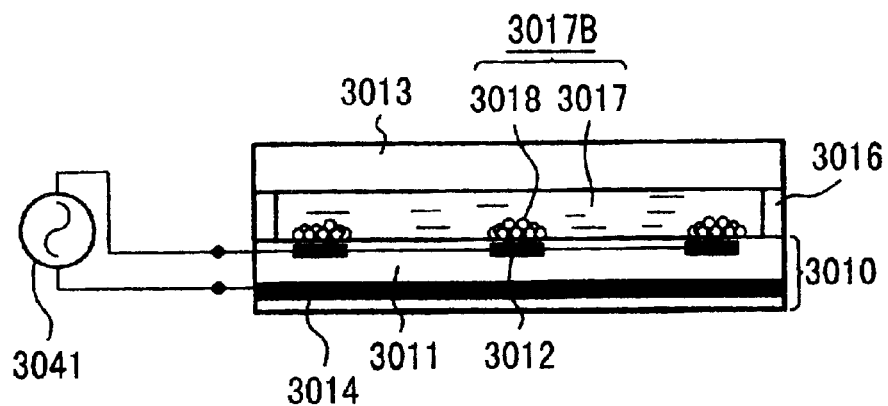
Figure 15:
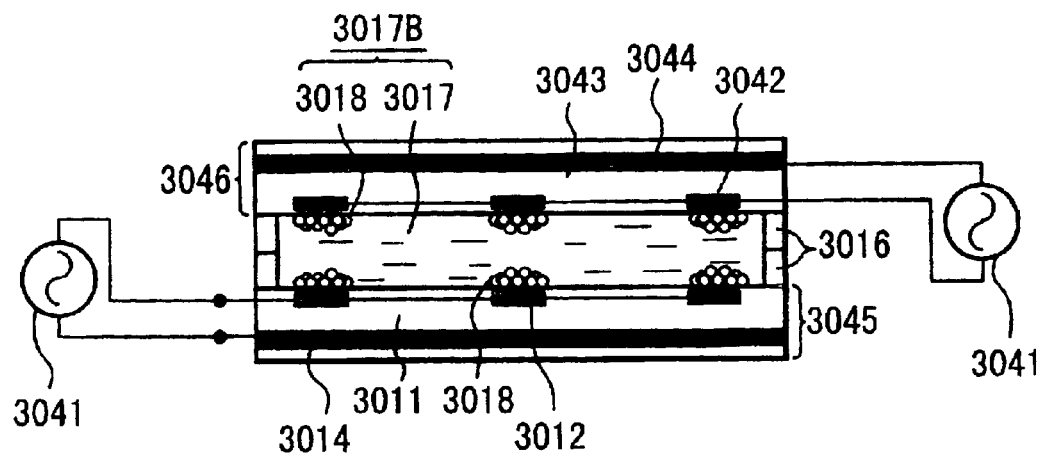

FIGS. 14 and 15 respectively illustrate a third step (assembling step). Referring to FIG. 14, for example, in opposition to the electrode sheet 3010 carrying the dispersion liquid, a second substrate 3013 is applied, and simultaneously, an excess of the dispersion liquid medium 3017 is squeezed out, followed by bonding between the first and second substrates 3011 and 3013. As a result, the dispersion liquid comprising the medium 3017 and the charged phoretic particles 3018 is sealed up in the device. Until substantially completing the third step, it is preferred to continually apply some AC or DC voltage between the electrodes so as to prevent the movement of the charged phoretic particles 3018 as by convection of the dispersion liquid.

FIG. 15 illustrates the application of a second electrode sheet identical to the electrode sheet 3015 instead of the second substrate 3013 shown in FIG. 14.

Figure 16A:
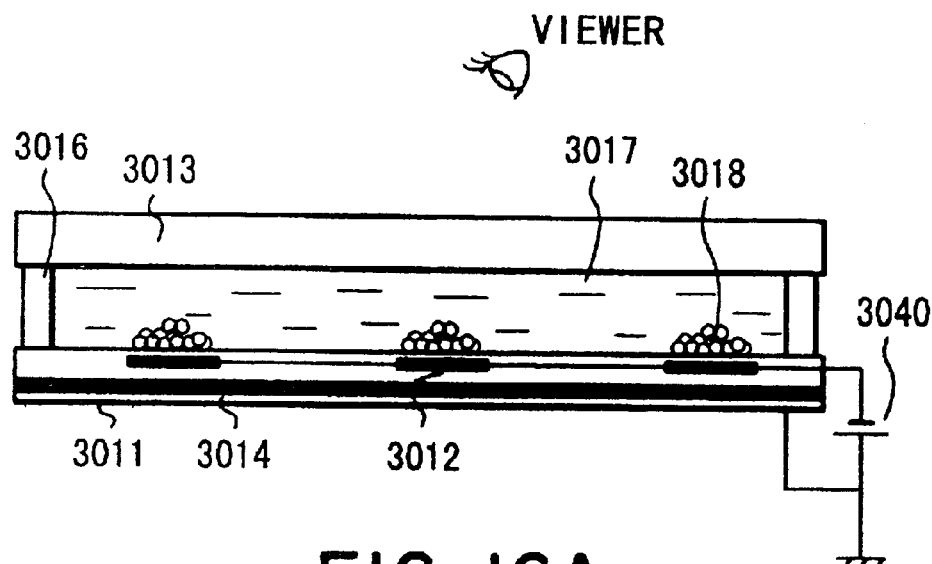
FIGS. 16A and 16B are schematic sectional views for illustrating an organization and an operation principle of an electrophoretic display device prepared according to the invention.

The thus-prepared display device is driven in such a manner that the charged phoretic particles 3018 are moved in parallel with the substrate surfaces depending on potential differences between the first electrodes 3012 and the second electrode 3014 to a position above the first electrodes 3012 or a position above the second electrode 3014 not covered with the first electrodes 3012. For example, as shown in FIGS. 16A and 16B, if the first electrodes 3012 are supplied with a negative voltage (FIG. 16A) or a positive voltage (FIG. 16B) relative to the second electrode 3014 grounded, positively charged phoretic particles are moved to one electrode of a relatively low potential (i.e., the first electrodes 3012 in FIG. 16A and the second electrode 3014 in FIG. 16B).

Figure 16B:
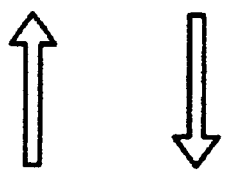
Figure 16B:
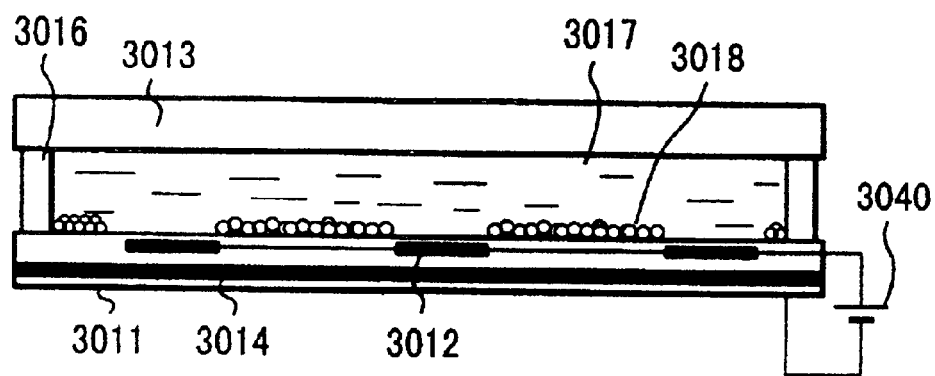
Figure 17:
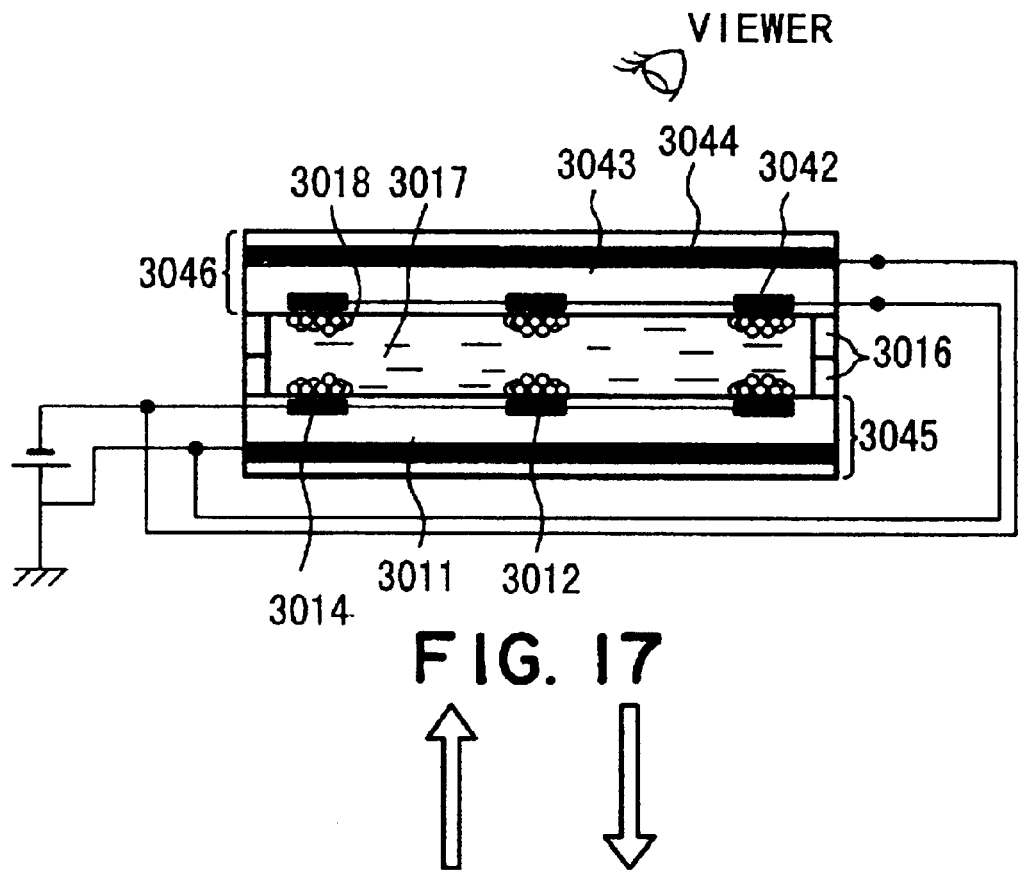
FIGS. 17 and 18 are schematic sectional views for illustrating an organization and an operation principle of another electrophoretic display device prepared according to the invention.

In this instance, in case where the charged phoretic particles 3018 and the first electrodes 3012 are colored in black and the second electrode 3014 is colored in white, a white display state is exhibited when the charged phoretic particles 3018 are collected above the first electrodes 3012 (FIG. 16A) and a black display state is exhibited when the charged phoretic particles 3018 are collected at a position above the second electrode 3014 not covered with the first electrodes 3012 (FIG. 16B).

Some specific examples of the above-described process will be described hereinbelow.

EXAMPLE 3-1

Referring to FIG. 9, a dispersion liquid medium 3017 was formed by dispersing a charge control agent (not specifically shown) in a principally aliphatic hydrocarbon liquid "ISOPER" (trade name), made by Exxon Co.), and black polystyrene particles having an average particle size of 1–2 μm as charged phoretic particles 3018 were dispersed therein to form a dispersion liquid 3017A, which was charged in a vessel 3050 as shown in FIG. 9. The concentration of charged phoretic particles 3018 in the dispersion liquid 3017A was set to be lower than that in the objective electrophoretic display device finally produced.

As shown in FIG. 9, a separately prepared electrode sheet 3010 comprising a 10 cm-square PET film substrate 3011 of 100 μm in thickness and provided with first electrodes 3012 and the second electrode 3014 was dipped in the dispersion liquid 3017A with its electrode-provided surface directed downwards. Immediately thereafter, a rectangular AC voltage of ±60 volts and 1 Hz was started to be applied between the first electrodes 3012 and the second electrode 3014. The voltage application was continued for 30 min.

Then, the level of the dispersion liquid 3017A in the vessel 3050 was gradually lowered to take the electrode sheet 3010 out of the dispersion liquid 3017.

Then, as a second step, the electrode sheet 3010 carrying the charged phoretic particles 3018 was inverted upside-down as shown in FIG. 13, while applying a DC voltage of 200 volts between the first electrodes 3012 (as positive electrode) and the second electrode 3014 (as negative electrode), and under the continued voltage application, a dispersion liquid medium 3017 containing a charge control agent dispersed therein was poured over the electrodes.

Then, as a third step, as shown in FIG. 14, while the DC voltage application was continued, a second substrate 3013 was disposed opposite to and gradually pressed against the electrode sheet 3010 to squeeze out an excessive portion of the dispersion liquid medium 3017.

Thereafter, the periphery and other bonding portions of the electrode sheet 3010 and the second substrate 3013 were bonded under heating to seal up a dispersion liquid 3017B comprising the dispersion liquid medium 3017 and the charged phoretic particles 3018 within a gap of 20 μm retained between the substrates to form an electrophoretic device comprising a matrix of rectangular cells each measuring 10 mm×5 mm and comprising 30 μm-wide stripe-form first electrodes (black) arranged at a pitch of 125 μm and a 10 mm×5 mm-second electrode (white).

The thus-formed electrophoretic display device exhibited a contrast of 8 at a response speed of ca. 10 msec when supplied with a drive voltage of ±40 volts.

EXAMPLE 3-2

Referring to FIG. 9, the process of Example 3-1 was repeated until the dipping of an electrode sheet 3010 within a dispersion liquid 3017A.

Immediately thereafter, a rectangular AC voltage of ±60 volts and 1 Hz was started to be applied between the first electrodes 3012 and the second electrode 3014. The voltage application was continued for 25 min. while horizontally vibrating the electrode sheet 3010 within the dispersion liquid 3017A.

Then, as a second step, as shown in FIG. 13, under a continual application of a DC voltage of 200 volts between the first electrodes 3012 (as positive electrode) and the second electrode 3014 (as negative electrode), a dispersion liquid medium 3017 containing a charge control agent dispersed therein was poured over the electrodes on the electrode sheet 3010.

Thereafter, the third step was repeated similarly as in Example 3-1 to complete an electrophoretic display device.

The thus-formed electrophoretic display device exhibited a contrast of 8 at a response speed of ca. 10 msec when supplied with a drive voltage of ±40 volts.

EXAMPLE 3-3

A dispersion liquid medium 3017, charged phoretic particles 3018, a dispersion liquid 3017A and an electrode sheet 3010, were prepared in the same manner as in Example 3-1. Then, as shown in FIG. 10, the electrode sheet 3010 was held obliquely, and under application of a rectangular AC voltage of ±60 volts and 1 Hz between the first electrodes 3012 and the second electrode 3014, the dispersion liquid 3017A comprising the dispersion liquid medium 3017 and the charged phoretic particles 3018 dispersed therein was sprayed several times onto the electrode-provided surface of the electrode sheet 3010. The above operation was continued for 25 min. while slowly rotating the electrode sheet 3010 about a vertical line passing through a center of the electrode sheet 3010 as a rotation axis.

The thus-treated electrode sheet 3010 carrying the charged phoretic particles 3018 thereon was thereafter subjected to the second and third steps similarly as in Example 3-1 to complete an electrophoretic display device.

The electrophoretic display device thus prepared exhibited a display contrast of ca. 8 at a response speed of ca. 10 msec when supplied with a drive voltage of ±40 volts.

EXAMPLE 3-4

A dispersion liquid medium 3017 and charged phoretic particles 3018 were prepared in the same manner as in Example 3-1.

Then, a mixture of the dispersion liquid medium and the charged phoretic particles was placed between a pair of electrode plates in a vessel (not shown), and by applying a DC voltage of 100 volts between the electrode plates, thereby selectively recovering a majority of the charged phoretic particles charged to a positive polarity. Then, the thus selected charged phoretic particles were dispersed in a fresh dispersion liquid medium 3017 to prepare a dispersion liquid 3017A at a concentration lower than that in an objective electrophoretic display device finally produced.

Then, as shown in FIG. 9, the dispersion liquid 3017A was filled in a vessel 3050, and an electrode sheet 3010 prepared similarly as in Example 3-1 was dipped in the dispersion liquid 3017A with its electrode-provided surface directed downwards. Immediately thereafter, a rectangular AC voltage of ±60 volts and 1 Hz was applied for 10 min. between the first electrodes 3012 and the second electrode 3014.

The thus-treated electrode sheet 3010 carrying the charged phoretic particles 318 thereon was thereafter subjected to the second and third steps similarly as in Example 3-1 to complete an electrophoretic display device.

The electrophoretic display device thus prepared exhibited a display contrast of 8 at a response speed of ca. 10 msec when supplied with a drive voltage of ±40 volts.

EXAMPLE 3-5

An electrophoretic display device as illustrated in FIG. 15 including two electrode sheets (i.e., a first electrode sheet 3045 farther from a viewer and a second electrode sheet 3046 closer to the viewer) was produced in the following manner.

Each of the first and second electrode sheets 3045 and 3046 was prepared in the same manner as the electrode sheet 3010 in Example 3-1 except that the first electrodes 3042 and the second electrode 3044 on the second electrode sheet 3046 were formed of transparent indium tin oxide (ITO). Moreover, a dispersion liquid medium 3017, charged phoretic particles 3018 and a dispersion liquid 3017A were prepared in the same manner as in Example 3-1.

Each of the first and second electrode sheets 3045 and 3046 was obliquely held in the place of an electrode sheet 3010 in FIG. 11, and the dispersion liquid 3017A was sprayed several times onto the electrode-provided surface of the electrode sheet while applying a rectangular AC voltage of ±30 volts and 1 Hz between the first electrodes 3012 and the second electrode 3014. The above operation was continued for 20 min. while slowly rotating the electrode sheet about a vertical line passing through a center of the electrode sheet.

Then, the first electrode sheet 3045 carrying the charged phoretic particles 3018 was set in the place of the electrode sheet 3010 in FIG. 13, and the dispersion liquid medium 3017 containing a charge control agent was poured over the electrodes 3012 and 3014 while applying a DC voltage of 100 volts between the first electrodes 3012 (as positive electrodes) and the second electrode 3014 (as negative electrode). The same operation was applied to the second electrode sheet 3046.

Then, as a third step, as shown in FIG. 15, while the DC voltage was continually applied between the first electrodes 3012 and the second electrode 3014 and between the first electrodes 3042 and the second electrode 3044, the second electrode sheet 3046 was disposed opposite to and slowly pressed against the first electrode sheet 3045 to squeeze out an excessive portion of the dispersion liquid medium 3017.

Thereafter, the periphery and other bonding portions of the first electrode sheet 3045 and the second electrode sheet 3046 were bonded under heating to seal up a dispersion liquid 3017B comprising the dispersion liquid medium 3017 and the charged phoretic particles 3018 within a gap of 15 μm retained between the substrates to form an electrophoretic display device.

An AC drive voltage of ±25 volts was applied synchronously between the first electrodes 3012 and the second electrode 3014 on the first electrode sheet 3045 and between the first electrodes 3042 and the second electrode 3044 on the second electrode sheet 3045, whereby the electrophoretic display device exhibited a contrast of 8 at a response time of ca. 7 msec.

As described above, according to Third Embodiment of the present invention as a process for producing an electrophoretic display device including a step of filling an electrophoretic dispersion liquid containing charged phoretic particles, it is possible to fill the dispersion liquid at an appropriate concentration distribution of the charged phoretic particles even in the case of a very small gap between a pair of substrates or the case of using a flexible substrate. As a result, it becomes possible to produce an electrophoretic display device having a very small gap between the substrates, which can exhibit a high contrast at a lower drive voltage than in the known devices.

(Fourth Embodiment)

According to an embodiment, the process for producing an electrophoretic display device comprises sequential steps including a first step of depositing charged phoretic particles on electrodes formed on a substrate surface; a second step of causing the charged phoretic particle-deposited substrate surface to contact a dispersion liquid medium, thereby leaving a reduced amount of the charged phoretic particles deposited on the substrate surface; a third step of disposing a dispersion liquid medium over the charged phoretic particles on the substrate; and assembling the substrate with another substrate to seal up a dispersion liquid comprising the charged phoretic particles and the dispersion liquid medium.

The respective steps are described in more details with reference to FIGS. 19–27, wherein only one cell section (display section) is shown for convenience of illustration, but such a cell may generally be arranged two-dimensionally to form an entire display device. In the process, a substrate (an electrode sheet) provided with first electrodes and a second electrode as formed by the method of JP-A 11-202804 may be used for preparing an electrophoretic display device. A functionally equivalent electrode sheet may also be used.

Such an electrode sheet can be formed from a substrate of a flexible material, such as polyethylene terephthalate (PET) or polyether sulfone (PES).

Figure 19:
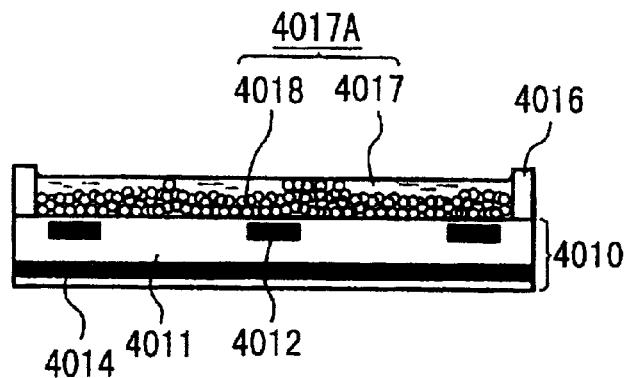
FIGS. 19, 20A, 20B, 21A, 21B, 22A, 22B, and 23–25 are schematic sectional views each illustrating a step involved in a process for producing an electrophoretic display device according to the invention.
Figure 20A:
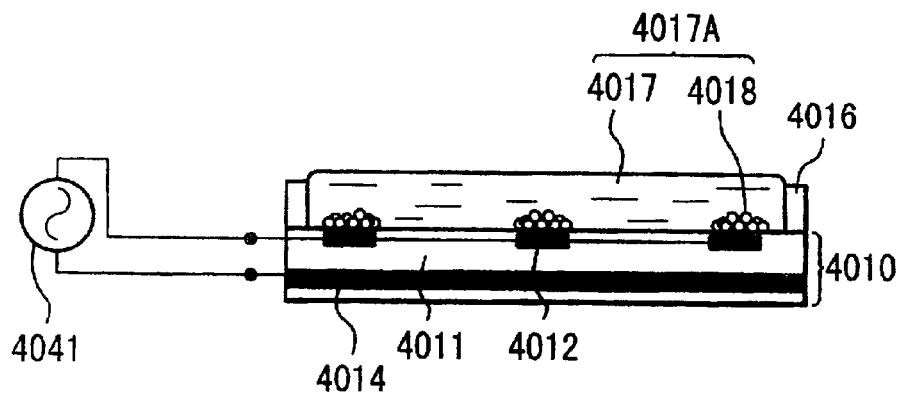
Figure 20B:
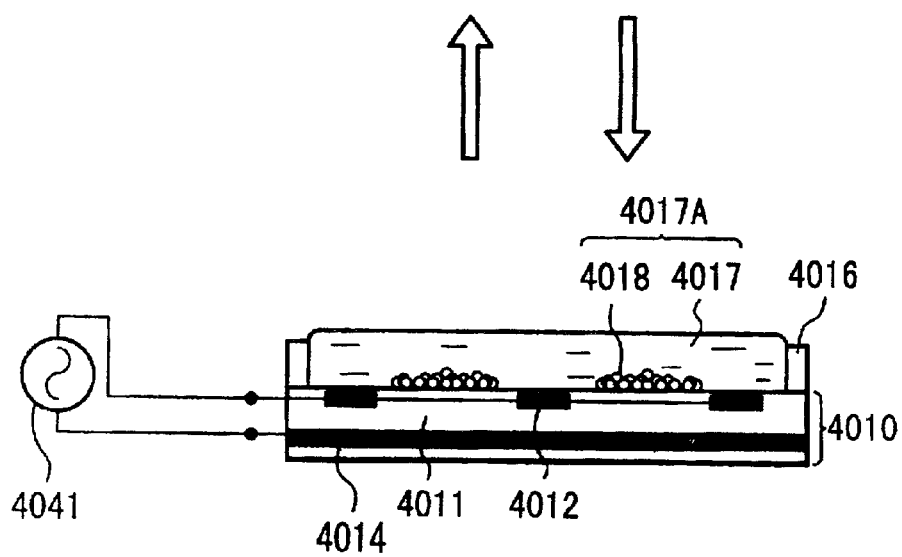

The above-mentioned first step of this process embodiment may be performed, e.g., by two methods as illustrated in FIG. 19 and FIGS. 20A–20B.

FIG. 19 illustrate one method wherein a surface of an electrode sheet 4010 provided with electrodes is covered with charged phoretic particles 4018. FIGS. 20A and 20B illustrate another method wherein charged phoretic particles 4018 dispersed in a dispersion liquid medium 4017 to form a dispersion liquid 4017A are selectively deposited on first electrodes 4012 or a position above a second electrode 4014 not covered with the first electrodes 4021 by applying a voltage between the first electrodes 4012 and the second electrode 4014.

In any case, it is preferred that the dispersion liquid medium 4017 also contains a charge control agent (not specifically shown).

The charge control agent may be a positive charge control agent or a negative charge control agent. As positive charge control agents, it is possible to use a naphthenic acid salt of a metal, such as cobalt, manganese or iron, zirconium octenate, etc. and as negative control agents, it is possible to use lecithin, calcium petroleum-sulfonate, calcium alkylbenzene-sulfonate, sodium dioctylsulfonate, alkylalanine, etc. Such a charger control agent can also be incorporated in phoretic particles.

The charged phoretic particles 4018 in the dispersion liquid medium 4017 are generally charged to an identical polarity. However, in a case where some portion of phoretic particles are charged to an opposite polarity, such an oppositely charged portion of charged phoretic particles may preferably be removed, e.g., by electrophoresis, in advance of the first step of deposition of the charged phoretic particles 4018 described with reference to FIGS. 19 and 20.

The above-mentioned two methods are described in further detail.

Referring to FIG. 19, the first step may be performed by dipping an electrode sheet 4010 in a dispersion liquid 4017A as a mixture of a dispersion liquid medium 4017 and charged phoretic particles 4018; or by ejecting, pouring or printing such a dispersion liquid 4017A onto the electrode sheet 4010 to cover the surface of the electrode sheet 4010 provided with the electrodes.

According to the latter method illustrated in FIGS. 20A and 20B, the charged phoretic particle 4018 are selectively deposited on first electrodes 4012 or a position above a second electrode 4014 not covered with the first electrodes 4012. For this purpose, the following steps are taken.

In a state where the electrode-provided surface of the electrode sheet 4010 is exposed to the dispersion liquid 4017A containing the charged phoretic particles 4018, if a periodically varying voltage is applied between the first electrodes 4012 and the second electrode 4014 from the voltage application circuit 4041, the charged phoretic particles 43018 are moved periodically between a state shown in FIG. 20A and a state shown in FIG. 20B according to electrophoresis, i.e., a state where the charged phoretic particles 3018 are collected above the first electrodes 4012 (FIG. 20A) or a state where the charged phoretic particles 4018 are moved to a place above the second electrode 4014 not covered with the first electrodes 4012 (FIG. 20B). If the voltage application is continued for a certain period, a certain amount of the charged phoretic particles are collected to the selected places shown in FIG. 20A or 20B.

The application voltage may have an amplitude up to 300 volts and a frequency of 0.01–50 Hz. Further, any voltage waveform may be used.

In the first step, the concentration of the charged phoretic particles 4018 in the dispersion liquid 4017A need not be appropriately adjusted. As a result, an excessive amount of the charged phoretic particles 4018 can be present on or above the first electrodes 4012 and/or the second electrode 4014, and also the charged phoretic particles 4018 can be present at a non-uniform charge distribution.

After the first step is completed according to the method of FIG. 19 or 20, the following steps are taken.

Figure 21A:
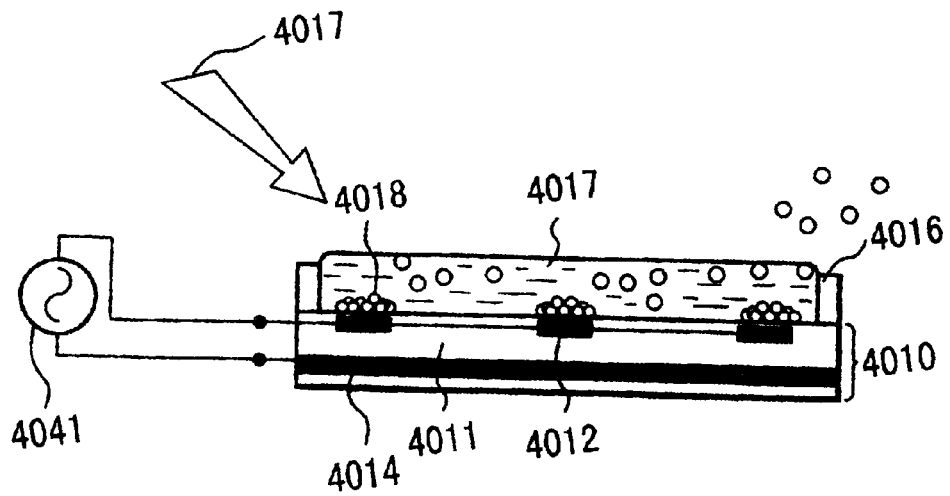
Figure 21B:
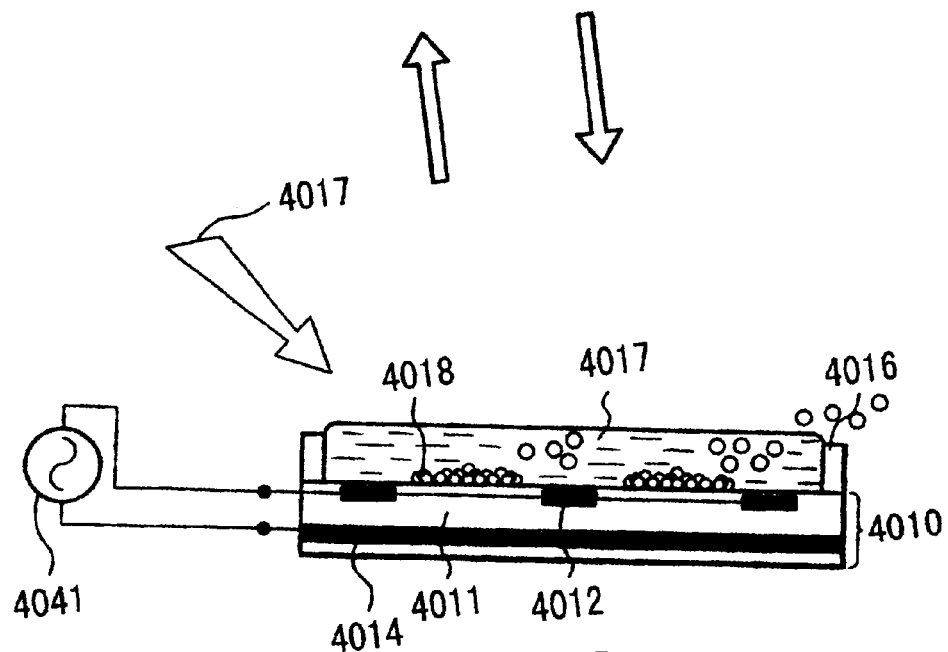
Figure 22A:
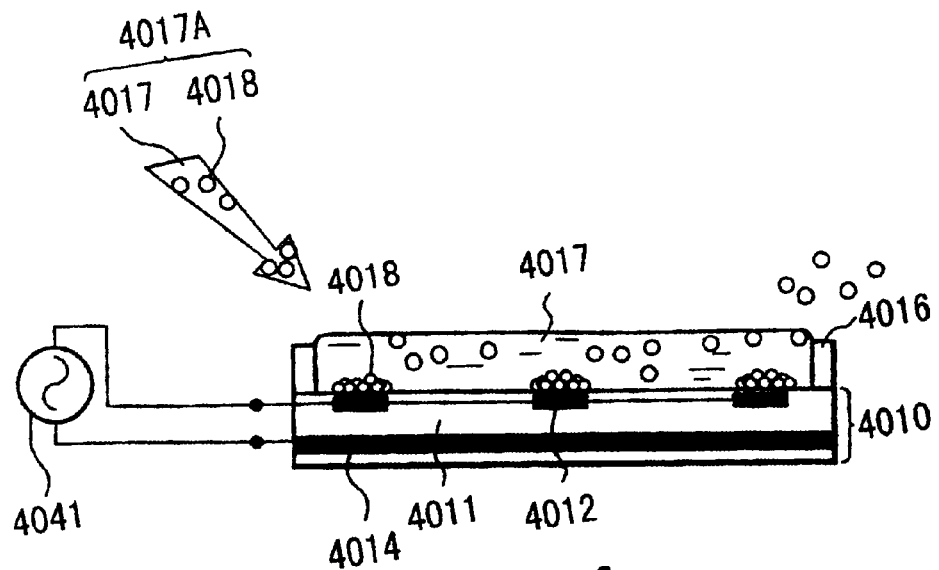
Figure 22B:
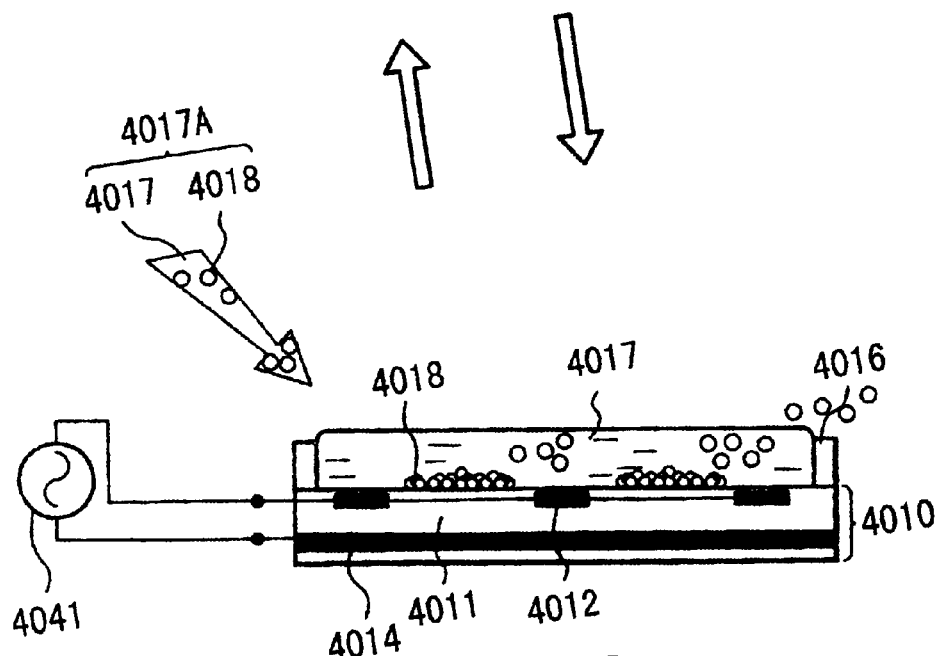

FIGS. 21A and 21B illustrate a second step wherein an excessive portion of the charged phoretic particles 4018 are removed by washing with a dispersion liquid medium 4017 alone (or in mixture with a relatively small amount of charged phoretic particles 4018 as shown in FIGS. 22A and 22B).

The excessive portion of the charged phoretic particles 4018 herein means a portion having a lower charge of the charged phoretic particles 4018 in the dispersion liquid 4017A and a portion of the charged phoretic particles 4018 having a nonuniform property thus possibly adversely affecting the electrophoretic performance of the charged phoretic particles 4018.

In the washing step shown in FIGS. 21A and 21B, an AC voltage is applied between the first electrodes 4012 and the second electrode 4014, and simultaneously the charged phoretic particles 4018 deposited on the electrode sheet 4010 possibly together with a minor proportion of the dispersion liquid 4017 are caused to contact freshly poured dispersion liquid 4017. As a result, a portion of the charged phoretic particles 4018 relatively weakly constrained by electrophoretic power acting between the first electrodes 4012 and the second electrode 4014 are washed out of the electrode sheet 4010.

The contacting with the dispersion liquid 4017 in the washing step may preferably be performed by dipping the electrode sheet 4010 after the first step within a bath of dispersion liquid medium 4017 alone or in mixture with charged phoretic particles 4018 or by ejecting or pouring a dispersion liquid medium 4017 alone or in mixture with charged phoretic particles 4018 onto the electrode sheet 4010 after the first step carrying the charged phoretic particles 4018. The ejection or pouring of the dispersion liquid medium 4017 may preferably be performed from plural directions. In any case, the washing step may preferably be performed under a repetitive movement, such as rotation or vibration.

The voltage applied in the second step may preferably be smaller than in the first step within a range of up to 300 volts and may preferably have a frequency of 0.01–50 Hz. The voltage waveform is not particularly restricted.

Figure 23:
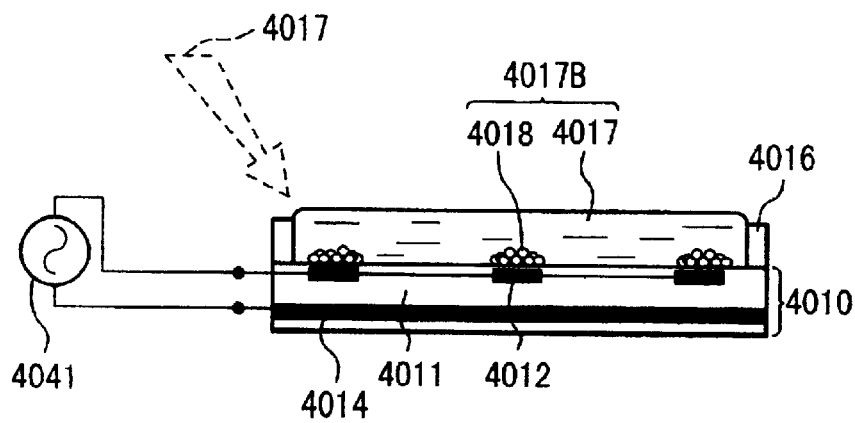

FIG. 23 illustrates a state of the electrode sheet 4010 after the second step wherein an excessive portion of charged phoretic particles 4018 have been removed (and also illustrates an optional third step). In this state, the charged phoretic particles 418 are disposed on the electrode sheet 4018 in an amount and a charge distribution appropriate for electrophoretic display. However, in order to adjust the concentration of the charged phoretic particles 4018 and supplement the dispersion liquid medium 4017, a fresh portion of dispersion liquid medium 4017 may preferably be slowly added to over the electrode sheet 4010 to provide a dispersion liquid 4017B suitable for electrophoretic display. The dispersion liquid medium 4017 may preferably contain a charge control agent dispersed therein, and the addition thereof may preferably be performed while applying an AC or DC voltage between the first electrodes 4012 and the second electrode 4014.

Figure 24:
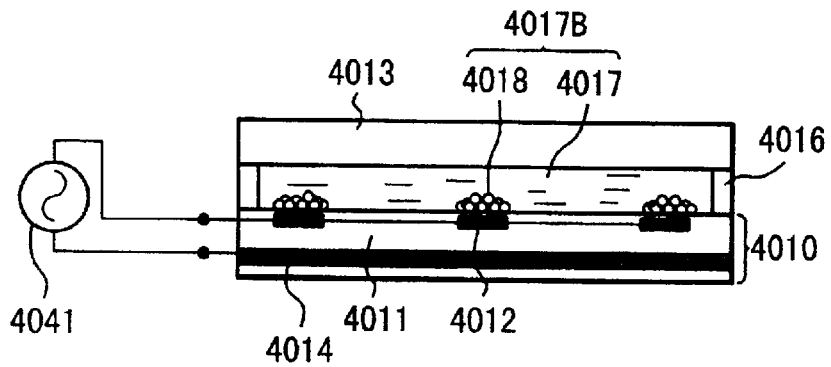

FIG. 24 illustrates a fourth step (assembling step). Referring to FIG. 24, in opposition to the electrode sheet 4010 carrying the dispersion liquid, a second substrate 4013 is applied, and simultaneously, an excess of the dispersion liquid medium 4017 is squeezed out, followed by bonding between the first and second substrates 4011 and 4013. As a result, the dispersion liquid 4017B comprising the medium 4017 and the charged phoretic particles 4018 is sealed up in the device. Until substantially completing the fourth step, it is preferred to continually apply some AC or DC voltage between the electrodes so as to prevent the movement of the charged phoretic particles 4018 as by connection of the dispersion liquid.

Figure 25:
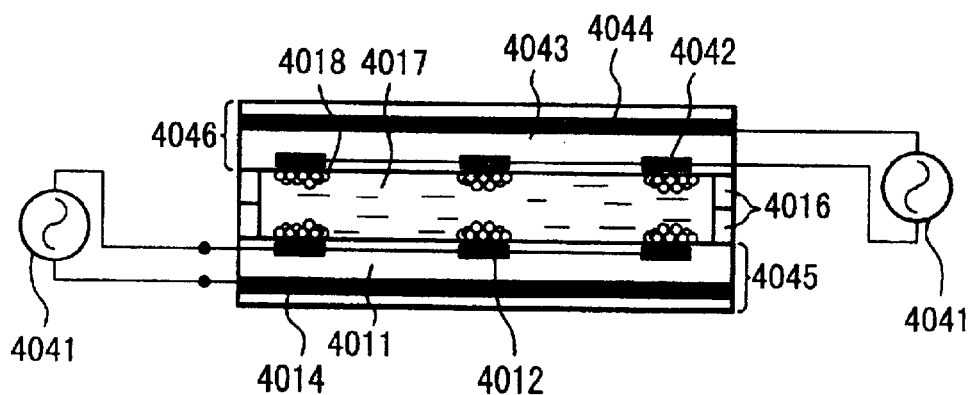

FIG. 25 illustrate the application of a second electrode sheet identical to the electrode sheet 4015 instead of the second substrate 4013 shown in FIG. 24.

Figure 26A:
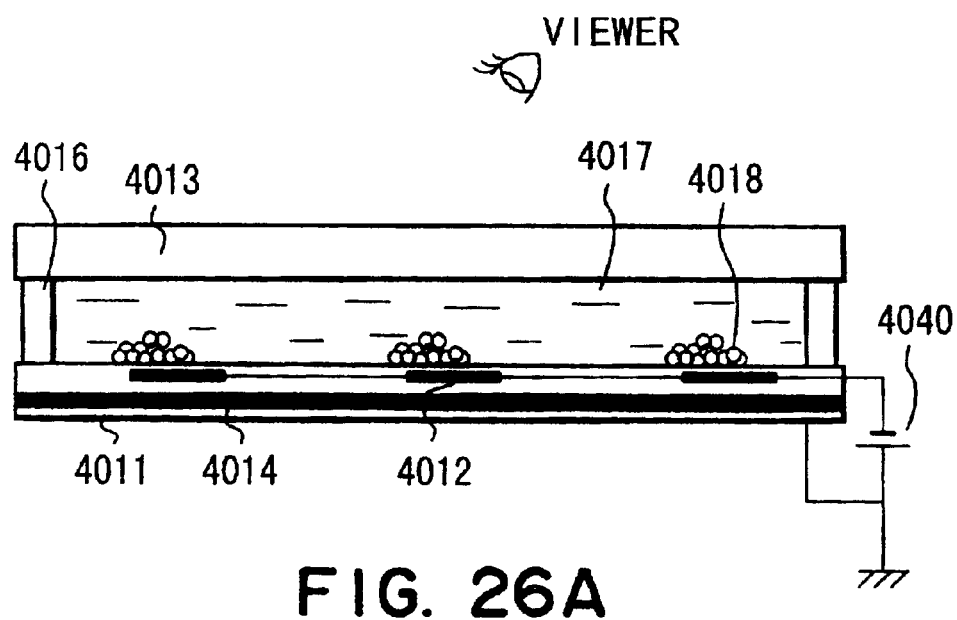
FIGS. 26A and 26B are schematic sectional views for illustrating an organization and an operation principle of an electrophoretic display device prepared according to the invention.

The thus-prepared display device is driven in such a manner that the charged phoretic particles 4018 are moved in parallel with the substrate surfaces depending on potential differences between the first electrodes 4012 and the second electrode 4014 to a position above the first electrodes 4012 or a position above the second electrode 4014 not covered with the first electrodes 4012. For example, as shown in FIGS. 26A and 26B, if the first electrodes 4012 are supplied with a negative voltage (FIG. 26A) or a positive voltage (FIG. 26B) relative to the second electrode 4014 grounded, positively charged phoretic particles are moved to one electrode of a relatively low potential (i.e., the first electrodes 4012 in FIG. 16A and the second electrode 4014 in FIG. 26B).

Figure 26B:
Figure 26B:
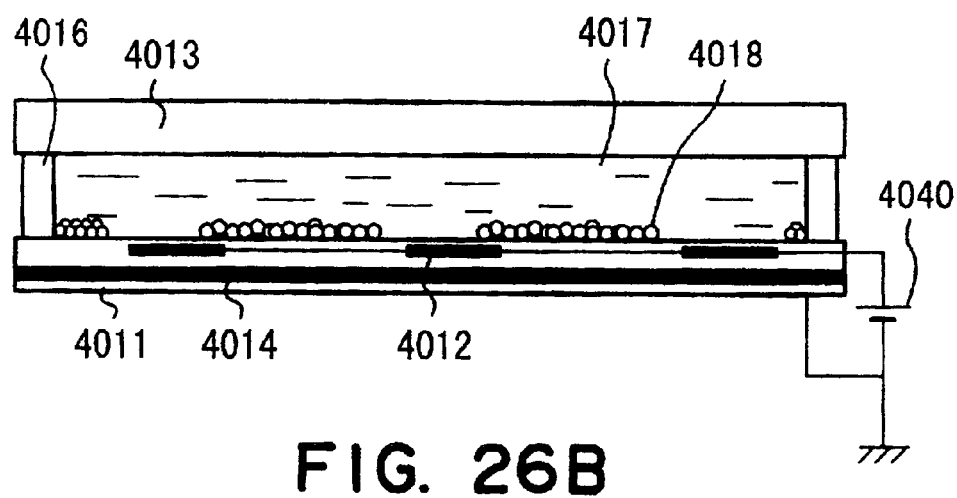
Figure 27A:
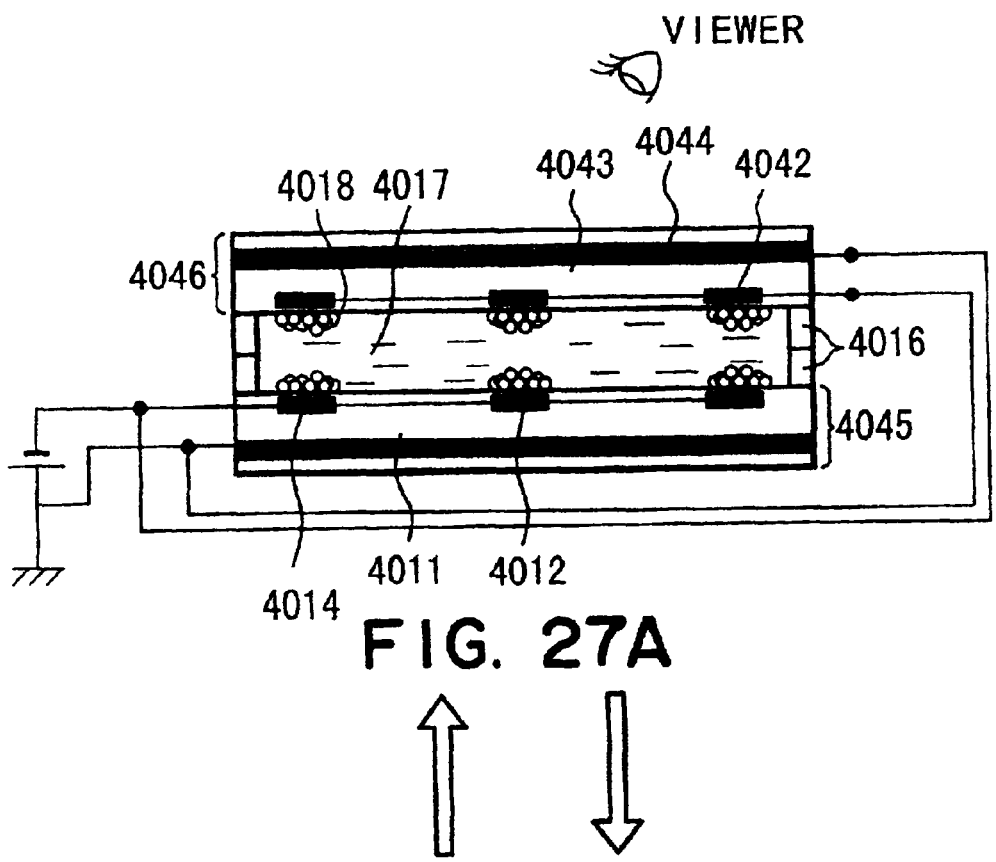
FIGS. 27A and 27B are schematic sectional views for illustrating an organization and an operation principle of another electrophoretic display device prepared according to the invention.
Figure 27B:
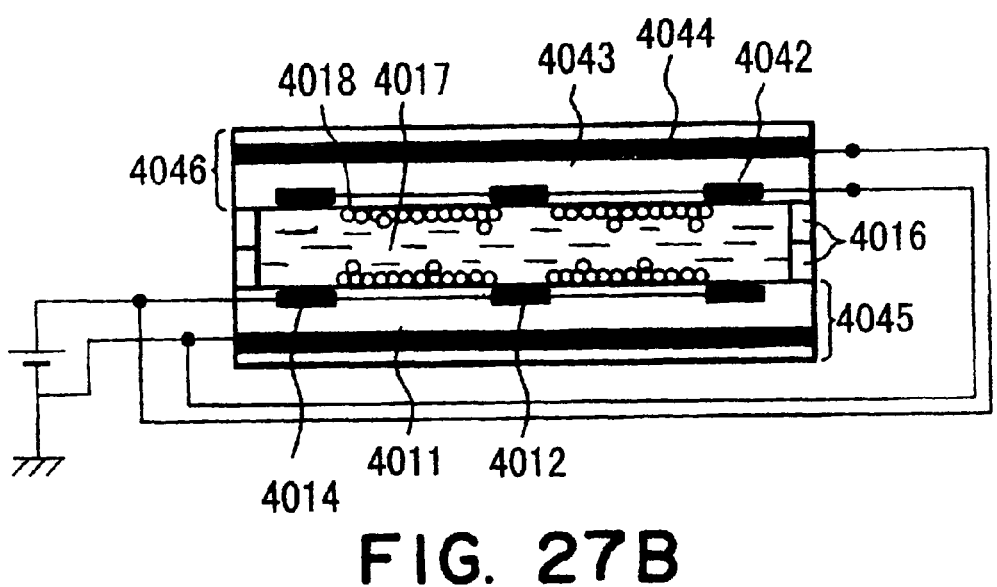

In this instance, in case where the charged phoretic particles 4018 and the first electrodes 4012 are colored in black and the second electrode 4014 is colored in white, a white display state is exhibited when the charged phoretic particles 4018 are collected above the first electrodes 4012 (FIG. 26A) and a black display state is exhibited when the charged phoretic particles 4018 are collected at a position above the second electrode 4014 not covered with the first electrodes 4012 (FIG. 26B).

Some specific examples of the above-described process will be described hereinbelow.

EXAMPLE 4-1

Figure 18:
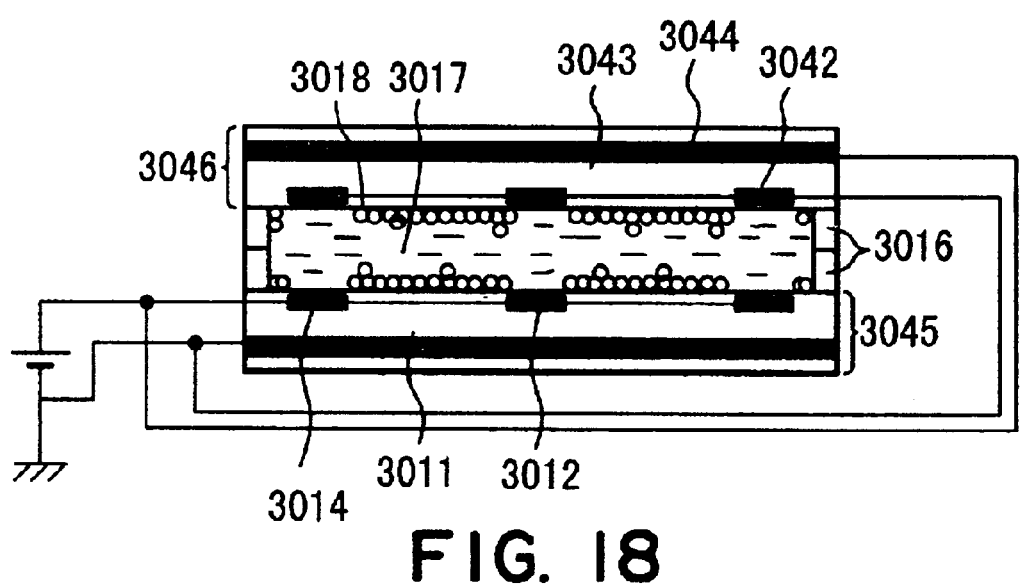

Referring to FIG. 18, a dispersion liquid medium 4017 was formed by dispersing a charge control agent (not specifically shown) in a principally aliphatic hydrocarbon liquid "ISOPER" (trade name), made by Exxon Co.), and black polystyrene particles having an average particle size of 1–2 $\mu$m as charged phoretic particles 4018 were dispersed therein to form a dispersion liquid 4017A. The concentration of charged phoretic particles 4018 in the dispersion liquid 4017A was set to be lower than that in the objective electrophoretic display device finally produced.

A separately prepared electrode sheet 4010 comprising a 10 cm-square PET film substrate 4011 of 100 $\mu$m in thickness and provided with first electrodes 4012 and the second electrode 4014 was dipped in the dispersion liquid 4017A contained in a vessel (not shown) with its electrode-provided surface directed upwards. Then, the electrode sheet 4010 was slowly pulled out of the bath of dispersion liquid 4017A. As a result, a state as shown in FIG. 19 where the electrode sheet 4010 was covered with the dispersion liquid 4017A was formed but with a less amount of the charged phoretic particles 4018 than shown in FIG. 19.

Then, as a second step as shown in FIGS. 21A and 21B, the electrode sheet 4010 was held in a slightly oblique state with application of a rectangular AC voltage of ±40 volts and 1 Hz, and a fresh dispersion liquid medium 4017 containing a charge control agent was slowly poured over the electrode-provided surface covered with the charged phoretic particles 4018 of the electrode sheet 4010.

The above operation was performed by slowly rotating the electrode sheet 4010 about a vertical line passing through a center of the electrode sheet 4010 as a rotation axis.

The above-mentioned first and second step operations were repeated 5 times.

Then, as a third step, while applying a DC voltage of 200 volts between the first electrodes 4012 (as positive electrode) and the second electrode 4014 (as negative electrode), a dispersion liquid medium 4017 containing a charge control agent dispersed therein was poured over the electrodes on the electrode sheet 4016 shown in FIG. 23.

Then, as a fourth step, as shown in FIG. 24, while the DC voltage application was continued, a second substrate 4013 was disposed opposite to and gradually pressed against the electrode sheet 4010 to squeeze out an excessive portion of the dispersion liquid medium 4017.

Thereafter, the periphery and other bonding portions of the electrode sheet 4010 and the second substrate 4013 were bonded under heating to seal up a dispersion liquid 4017B comprising the dispersion liquid medium 4017 and the charged phoretic particles 4018 within a gap of 20 $\mu$m retained between the substrates.

The thus-formed electrophoretic display device exhibited a contrast of 8 at a response speed of ca. 10 msec when supplied with a drive voltage of ±40 volts between the first electrodes 4012 and the second electrode 4014.

EXAMPLE 4-2

A dispersion liquid medium 4017, charged phoretic particles 4018, a dispersion liquid 4017A and an electrode sheet 4010 were prepared in the same manner as in Example 4-1.

Then, as a first step, while holding the electrode sheet 4010 obliquely at an angle of ca. 30 deg. from the horizon and slowly vibrating the electrode sheet 4010, the dispersion liquid 4017A was ejected against the electrode-provided surface of the electrode sheet 4010, to provide a state of the electrode sheet 4010 carrying the charged phoretic particles as shown in FIG. 19 but with less charged phoretic particles than shown therein.

Then, as a second step as shown in FIGS. 21A and 21B, the electrode sheet 4010 was held in a slightly oblique state with application of a rectangular AC voltage of ±40 volts and 1 Hz, and a fresh dispersion liquid medium 4017 containing a charge control agent was slowly poured over the electrode-provided surface covered with the charged phoretic particles 4018 of the electrode sheet 4010.

The above operation was performed while slowly rotating the electrode sheet 4010 about a vertical line passing through a center of the electrode sheet 4010 as a rotation axis.

The above-mentioned first and second step operations were repeated 4 times.

By using the electrode sheet 4010 thus treated, the third and following steps were performed in the same manner as in Example 4-1 to obtain an electrophoretic display device.

The thus-formed electrophoretic display device exhibited a contrast of 8 at a response speed of ca. 10 msec when supplied with a drive voltage of ±40 volts between the first electrodes 4012 and the second electrode 4014.

EXAMPLE 4-3

A dispersion liquid medium 4017, charged phoretic particles 4018, a dispersion liquid 4017A and an electrode sheet 4010 were prepared in the same manner as in Example 4-1.

Then, as a first step, the dispersion liquid 4017A was uniformly printed on the electrode-provided surface of the electrode sheet 4010.

Then, as a second step as shown in FIGS. 21A and 21B, the electrode sheet 4010 was held in a slightly oblique state with application of a rectangular AC voltage of ±40 volts and 1 Hz, and a fresh dispersion liquid medium 4017 containing a charge control agent was slowly poured over the electrode-provided surface covered with the charged phoretic particles 4018 of the electrode sheet 4010.

The above operation was performed while slowly rotating the electrode sheet 4010 about a vertical line passing through a center of the electrode sheet 4010 as a rotation axis.

The above-mentioned first and second step operations were repeated 4 times.

By using the electrode sheet 4010 thus treated, the third and following steps were performed in the same manner as in Example 4-1 to obtain an electrophoretic display device.

The thus-formed electrophoretic display device exhibited a contrast of 8 at a response speed of ca. 10 msec when supplied with a drive voltage of ±40 volts between the first electrodes 4012 and the second electrode 4014.

EXAMPLE 4-4

A dispersion liquid medium 4017, charged phoretic particles 4018, a dispersion liquid 4017A and an electrode sheet 4010 were prepared in the same manner as in Example 401.

Then, as a first step, the electrode sheet 4010 was dipped in the dispersion liquid 4017A with its electrode-provided surface directed downwards while slowly stirring the dispersion liquid 4017A. Immediately thereafter, a rectangular AC voltage of ±60 volts and 1 Hz was started to be applied between the first electrodes 4012 and the second electrode 4014. The voltage application was continued for 3 min.

Then, the level of the dispersion liquid 4017A in the vessel was gradually lowered to take the electrode sheet 4010 out of the dispersion liquid 4017A.

Then, as a second step as shown in FIGS. 21A and 21B, the electrode sheet 4010 was held in a slightly oblique state with application of a rectangular AC voltage of ±40 volts and 1 Hz, and a fresh dispersion liquid medium 4017 containing a charge control agent was slowly poured over the electrode-provided surface covered with the charged phoretic particles 4018 of the electrode sheet 4010.

The above operation was performed while slowly rotating the electrode sheet 4010 about a vertical line passing through a center of the electrode sheet 4010 as a rotation axis.

The above-mentioned first and second step operations were repeated 3 times.

By using the electrode sheet 4010 thus treated, the third and following steps were performed in the same manner as in Example 4-1 to obtain an electrophoretic display device.

The thus-formed electrophoretic display device exhibited a contrast of 8 at a response speed of ca. 10 msec when supplied with a drive voltage of ±40 volts between the first electrodes 4012 and the second electrode 4014.

EXAMPLE 4-5

A dispersion liquid medium 4017, charged phoretic particles 4018, a dispersion liquid 4017A and an electrode sheet 4010 were prepared in the same manner as in Example 4-1.

Then, as a first step, the dispersion liquid 4017A was poured onto the electrode-provided surface of the electrode sheet 4010, followed immediately by 3 minutes of application of a rectangular AC voltage of ±60 volts and 1 Hz.

Then, as a second step, while continuing the AC voltage application, the electrode sheet 4010 was dipped in a bath of the dispersion liquid 4017A under slow stirring with its electrode-provided surface directed downwards and slowly rotated therein for 3 min.

The above-mentioned first and second steps were repeated 4 times.

Then, as a third step, while continuing the AC voltage application, the dispersion liquid 4017A was poured onto the electrode sheet 4010 which was held obliquely and slowly rotated about a vertical line passing through the center of the electrode sheet 4010 as a rotation axis.

By using the electrode sheet 4010 thus treated, the fourth and following steps were performed in the same manner as in Example 4-1 to obtain an electrophoretic display device.

The thus-formed electrophoretic display device exhibited a contrast of 8 at a response speed of ca. 10 msec when supplied with a drive voltage of ±40 volts between the first electrodes 4012 and the second electrode 4014.

EXAMPLE 4-6

A dispersion liquid medium 4017 and charged phoretic particles 4018 were prepared in the same manner as in Example 4-1.

Then, a mixture of the dispersion liquid medium and the charged phoretic particles was placed between a pair of electrode plates in a vessel (not shown), and by applying a DC voltage of 200 volts between the electrode plates, thereby selectively recovering a majority of the charged phoretic particles charged to a positive polarity. Then, the thus selected charged phoretic particles were dispersed in a fresh dispersion liquid medium 4017 to prepare a dispersion liquid 4017A at a concentration lower than that in an objective electrophoretic display device finally produced.

Then, as a first step, the dispersion liquid 4017A was filled in a vessel (not shown), and an electrode sheet 4010 prepared similarly as in Example 4-1 was dipped in the dispersion liquid 4017A with its electrode-provided surface directed downwards. Immediately thereafter, a rectangular AC voltage of ±60 volts and 1 Hz was applied for 6 min. between the first electrodes 4012 and the second electrode 4014.

Then, as a second step as shown in FIGS. 21A and 21B, the electrode sheet 4010 was held in a slightly oblique state with application of a rectangular AC voltage of ±40 volts (lower than in the first step) and 1 Hz, and a fresh dispersion liquid medium 4017 containing a charge control agent was slowly poured over the electrode-provided surface covered with the charged phoretic particles 4018 of the electrode sheet 4010.

The above operation was performed while slowly rotating the electrode sheet 4010 about a vertical line passing through a center of the electrode sheet 4010 as a rotation axis.

The above-mentioned first and second step operations were repeated 2 times.

By using the electrode sheet 4010 thus treated, the third and following steps were performed in the same manner as in Example 4-1 to obtain an electrophoretic display device.

The thus-formed electrophoretic display device exhibited a contrast of 8 at a response speed of ca. 10 msec when supplied with a drive voltage of ±40 volts between the first electrodes 4012 and the second electrode 4014.

EXAMPLE 4-7

A dispersion liquid medium 4017, charged phoretic particles 4018, a dispersion liquid 4017A and an electrode sheet 4010 were prepared in the same manner as in Example 401.

Then, as a first step, the electrode sheet 4010 was dipped in a bath of the dispersion liquid 4017A with its electrode-provided surface directed upwards.

Then, the electrode sheet 4010 was slowly pulled out of the bath of dispersion liquid 4017A. As a result, a state as shown in FIG. 19 where the electrode sheet 4010 was covered with the dispersion liquid 4017A was formed but with a less amount of the charged phoretic particles 4018 than shown in FIG. 19.

Then, as a second step as shown in FIGS. 22A and 22B, the electrode sheet 4010 was held in a slightly oblique state with application of a rectangular AC voltage of ±40 volts and 1 Hz, and a fresh dispersion liquid 4017A containing a charge control agent and charged phoretic particles 4018 was slowly poured over the electrode-provided surface covered with the charged phoretic particles 4018 of the electrode sheet 4010.

The above operation was performed while slowly rotating the electrode sheet 4010 about a vertical line passing through a center of the electrode sheet 4010 as a rotation axis.

The above-mentioned first and second step operations were repeated 3 times.

By using the electrode sheet 4010 thus treated, the third and following steps were performed in the same manner as in Example 4-1 to obtain an electrophoretic display device.

The thus-formed electrophoretic display device exhibited a contrast of 8 at a response speed of ca. 10 msec when supplied with a drive voltage of ±40 volts between the first electrodes 4012 and the second electrode 4014.

EXAMPLE 4-8

An electrophoretic display device as illustrated in FIG. 25 including two electrode sheets (i.e., a first electrode sheet 4045 farther from a viewer and a second electrode sheet 4046 closer to the viewer) was produced in the following manner.

Each of the first and second electrode sheets 4045 and 4046 was prepared in the same manner as the electrode sheet 4010 in Example 4-1 except that the first electrodes 4042 and the second electrode 4044 on the second electrode sheet 4046 were formed of transparent indium tin oxide (ITO). Moreover, a dispersion liquid medium 4017, charged phoretic particles 4018 and a dispersion liquid 4017A were prepared in the same manner as in Example 4-1.

The first electrode sheet 4045 was dipped in the dispersion liquid 4017A with its electrode-provided surface directed downwards while slowly stirring the dispersion liquid 4017A. Immediately thereafter, a rectangular AC voltage of ±60 volts and 1 Hz was started to be applied between the first electrodes 4012 and the second electrode 4014. The voltage application was continued for 3 min.

Then, the level of the dispersion liquid 4017A in the vessel was gradually lowered to take the electrode sheet 4010 out of the dispersion liquid 4017A.

Then, as a second step as shown in FIGS. 21A and 21B, the electrode sheet 4010 was held in a slightly oblique state with application of a rectangular AC voltage of ±40 volts (lower than in the first step) and 1 Hz, and a fresh dispersion liquid medium 4017 containing a charge control agent was slowly poured over the electrode-provided surface covered with the charged phoretic particles 4018 of the electrode sheet 4010.

The above operation was performed while slowly rotating the electrode sheet 4010 about a vertical line passing through a center of the electrode sheet 4010 as a rotation axis.

The above-mentioned first and second step operations were repeated 3 times.

The second electrode sheet 4046 was treated in the same manner as the first electrode sheet 4045 described above.

Then, as a third step, as shown in FIG. 25, while the DC voltage was continually applied between the first electrodes 4012 and the second electrode 4014 and between the first electrodes 4042 and the second electrode 4044, the second electrode sheet 4046 was disposed opposite to and slowly pressed against the first electrode sheet 4045 to squeeze out an excessive portion of the dispersion liquid medium 4017.

Thereafter, the periphery and other bonding portions of the first electrode sheet 4045 and the second electrode sheet 4046 were bonded under heating to seal up a dispersion liquid 4017B comprising the dispersion liquid medium 4017 and the charged phoretic particles 4018 within a gap of 15 μm retained between the substrates to form an electrophoretic display device.

An AC drive voltage of ±25 volts was applied synchronously between the first electrodes 4012 and the second electrode 4014 on the first electrode sheet 4045 and between the first electrodes 4042 and the second electrode 4044 on the second electrode sheet 4045, whereby the electrophoretic display device exhibited a contrast of 8 at a response time of ca. 7 msec.

As described above, according to Fourth Embodiment of the present invention as a process for producing an electrophoretic display device including a step of filling an electrophoretic dispersion liquid containing charged phoretic particles, it is possible to remove a portion of charged phoretic particles having a lower charge and a desired concentration distribution of charged phoretic particles by including a washing step using a dispersion liquid medium even in the case of a very small gap between a pair of substrates or the case of using a flexible substrate. As a result, it becomes possible to produce an electrophoretic display device having a very small gap between the substrates, which can exhibit a high contrast at a lower drive voltage than in the known devices.

(Fifth Embodiment)

FIGS. 28–35 illustrate various steps involved in this embodiment of process for producing an electrophoretic (display) device, and FIGS. 36–37 illustrate the organization and operation of the resultant devices. In most figures, only two cell sections (display cells or pixels), are shown for convenience of illustration but actual devices include larger number of such cells two-dimensionally arranged. In these figures, common numerals or symbols are used for representing identical members. More specifically, these figures commonly show member, such as a first substrate 5001, a first electrode 5002, a second substrate 5003, a second electrode 5004, a spacer 5007 also functioning as a partitioning wall for partitioning the device and the dispersion liquid (system) contained thereinto small cell sections as mentioned above, a dispersion liquid medium 5008, charged phoretic particles 5009, a voltage application circuit 5040, a nozzle 5050, a fluorine-containing resin layer 5060, a closed vessel 5065, an ultrasonic wave applicator 5070, and an electrophoretic device (panel) 50100.

In most figures, there is shown a device example wherein first electrodes 5002 and second electrodes 5004 are formed on an identical substrate, particularly on a first substrate 5001 for convenience of convenience of described, which can be prepared by a process, e.g., as disclosed in JP-A 11-202804. This is however just an example, and the present invention is not restricted thereto. For example, the pair of first and second electrodes can be formed on the second substrate 5003, and the present invention also allows the disposition of the first electrodes 5002 and the second electrodes 5004 on one and the other substrate, respectively.

Incidentally, in a display device having the above-mentioned pair of first electrode and second electrode are disposed on one substrate, unlike in a conventional device as illustrated in FIGS. 1A and 1B, charged phoretic particle 5009 are moved between first electrode and second electrode horizontally, i.e., in parallel to the substrate extension, within the dispersion liquid medium, to either a position above the first electrode 5002 or a position above the second electrode 5004 not covered by the first electrode 5002 depending on a potential difference between these electrodes, thereby effecting a display.

Figure 3A:
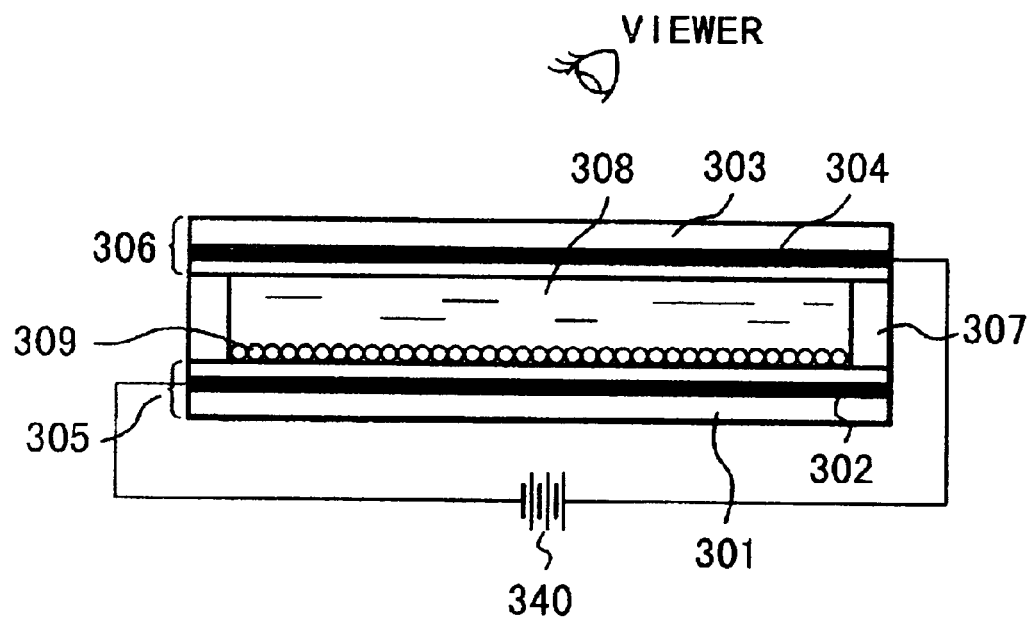
Figure 3B:
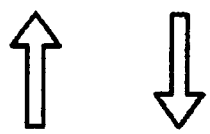
Figure 3B:
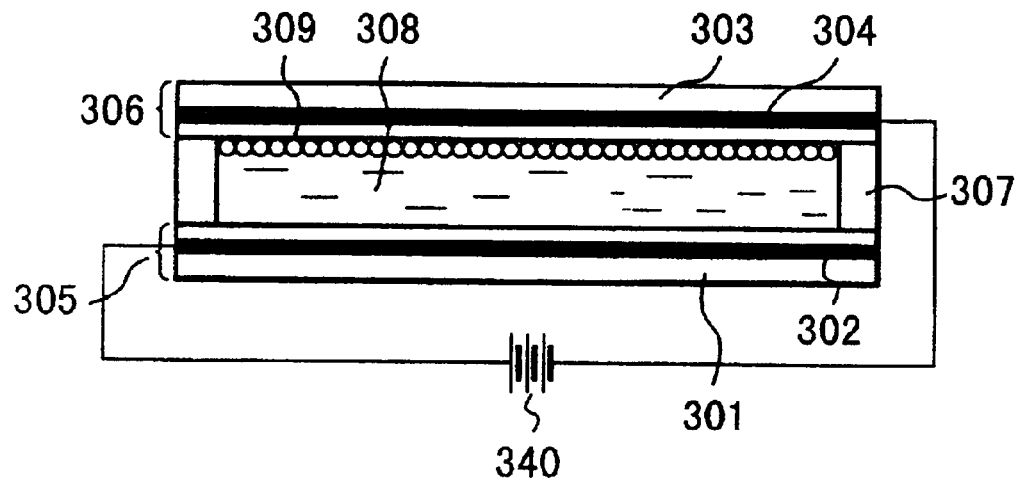
Figure 4:
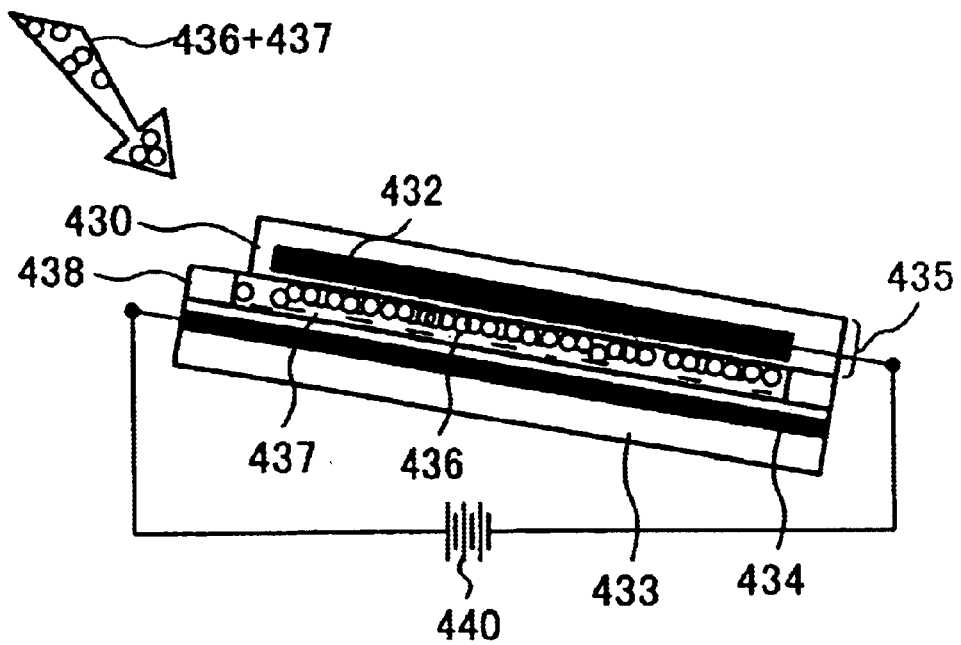
Figure 36A:
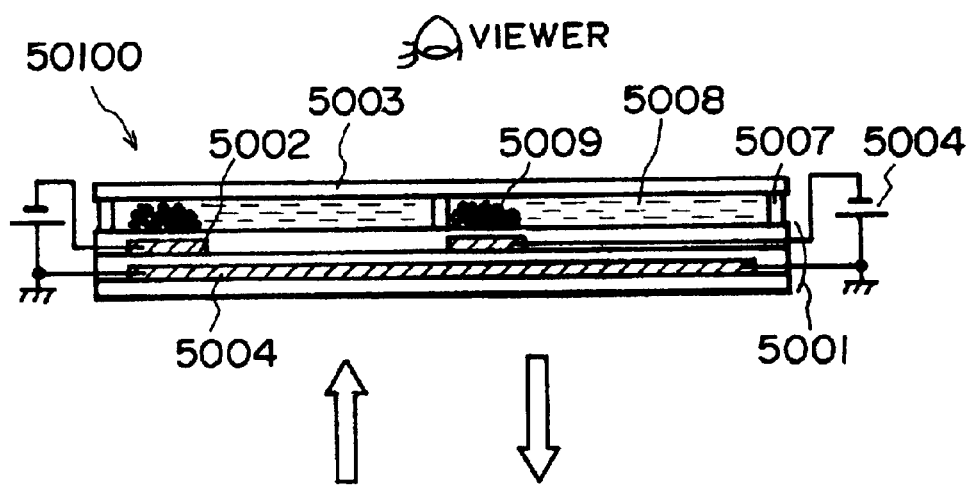
FIGS. 36A and 36B are schematic sectional views for illustrating an organization and an operation principle of an electrophoretic display device prepared according to the invention.
Figure 36B:
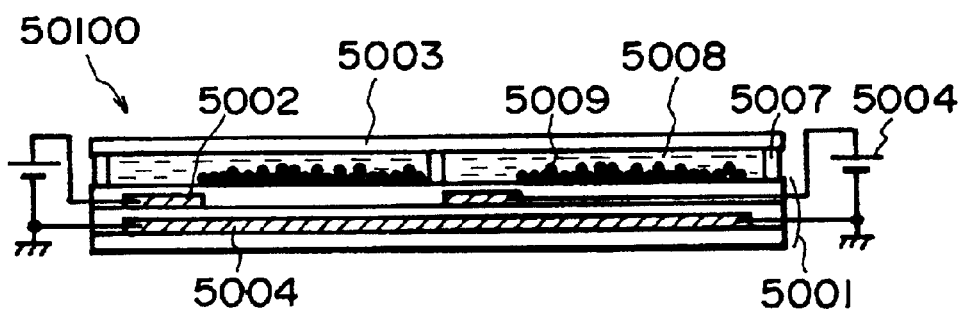

For example, for positively charged phoretic particles 5009, when a positive or a negative voltage is applied to the first electrodes 5002 while the second electrode 5004 is grounded as shown in FIGS. 36A and 36B, the positively charged phoretic particle 5009 are moved to an electrode of a lower potential (i.e., the first electrode 5002 in FIG. 36A or the second electrode 5004 in FIG. 3B). Then, in the case where the charged phoretic particle 5009 and the first electrodes 5002 are colored in black, and the second electrode 5004 is colored in white, a white state is displayed when the charged phoretic particles 5009 are collected above the first electrodes 5002, and a black state is displayed when the charged phoretic particles 5009 are collected at a position above the second electrode 5004 not covered by the first electrodes 5002.

The process of the present invention is classified into two modes, i.e., a first mode wherein charged phoretic particles are attached to at least one of two substrates, then the two substrates are applied to each other to form a non-filled device (panel), and then a dispersion liquid medium is injected into the device, and a second mode wherein a dispersion liquid is disposed on a substrate prior to application of the two substrate. The following Embodiments 5-1 and 5-2 are embodiment according to the first mode, and Embodiment 5-3 is an embodiment according to the second mode.

(Embodiment 5-1)

According to this embodiment, the process for producing an electrophoretic (display) device comprises sequential steps including a first step of causing an electrode sheet provided with a pair of electrodes to contact a dispersion liquid while applying a voltage between the electrodes; a second step of vaporizing a portion of the dispersion liquid medium in the dispersion liquid on the electrode sheet; a third step of applying two substrates including the electrode sheet to each other; a fourth step of filling the dispersion liquid medium between the substrates to form a dispersion liquid; a fifth step of sealing up the dispersion liquid within the device (panel); and a sixth step of imparting vibration to the charged phoretic particles to cause a diffusion of the charged phoretic particles in the dispersion liquid medium. The respective steps will be described in further detail below.

(First Step)

A dispersion liquid is caused to contact an electrode-provided surface of an electrode sheet while applying a voltage between a pair of electrodes provided to the electrode sheet.

Figure 28A:
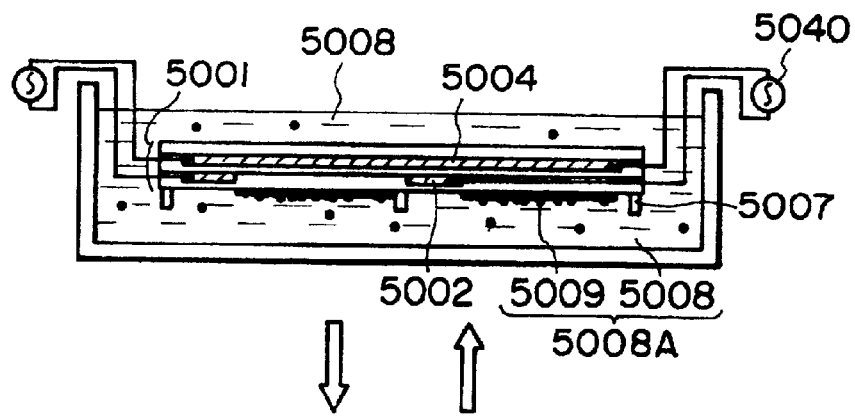
FIGS. 28A–28C, 29A–29C and 30–35 are schematic sectional views each illustrating a step involved in a process for producing an electrophoretic display device according to the invention.
Figure 28B:
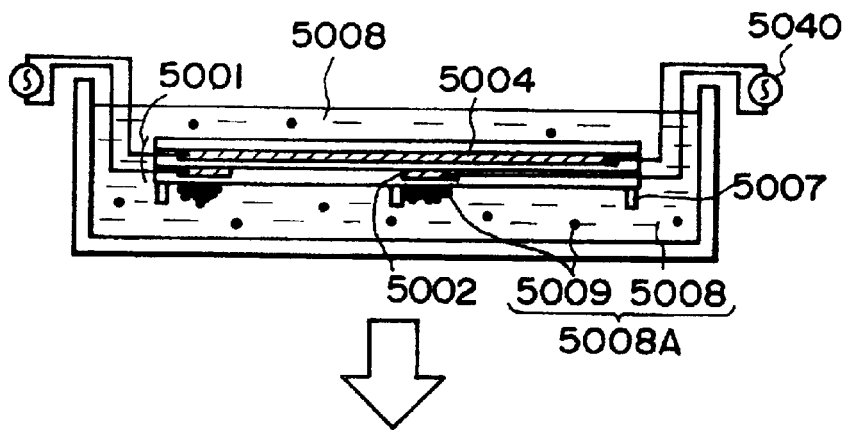

The contact of the first substrate (as electrode sheet) with a dispersion liquid may be performed in various ways, e.g., by dipping the first substrate 5001 within a dispersion liquid 5008A comprising a mixture of a dispersion liquid medium 5008 and charged phoretic particles 5009 (FIGS. 28A–28C); pouring of the dispersion liquid 5008A over the first substrate 5001 (FIGS. 29A–29C), etc. In this instance, by applying a voltage of alternating polarities (i.e., an AC voltage) between the first electrodes 5002 and the second electrode 5004 as shown in FIGS. 28A and 28B, etc. it becomes easy to control the amount of charged phoretic particles 5009 attracted to the first substrate 5001.

Figure 28C:
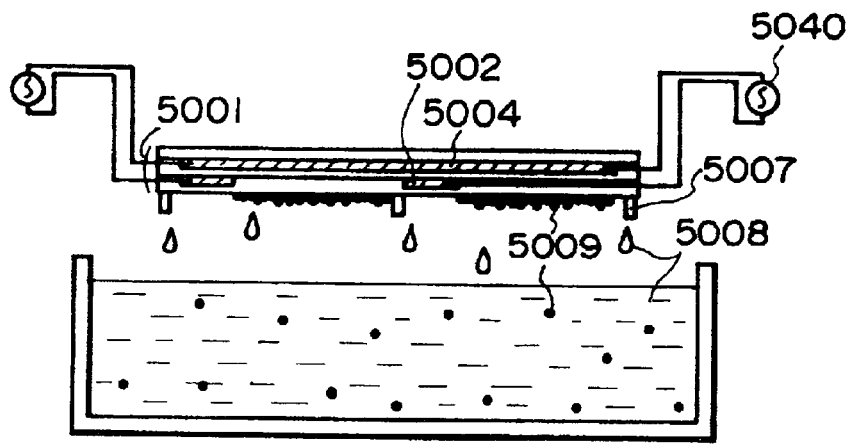

In the case of dipping within the dispersion liquid 5008A, it is possible to dip the first substrate 5001 with its electrode-provided surface directed downward, and then pull the first substrate 5001 out of the dispersion liquid while continually applying a voltage between the electrodes (FIG. 28C). In this instance, it is also possible to incline the first substrate at an appropriate angle between 1 deg. to 179 deg. at the time of pulling the first substrate out of the dispersion liquid 5008A. Any manner allowing removal of an excess of the dispersion liquid medium 5008 may be adopted.

Figure 29A:
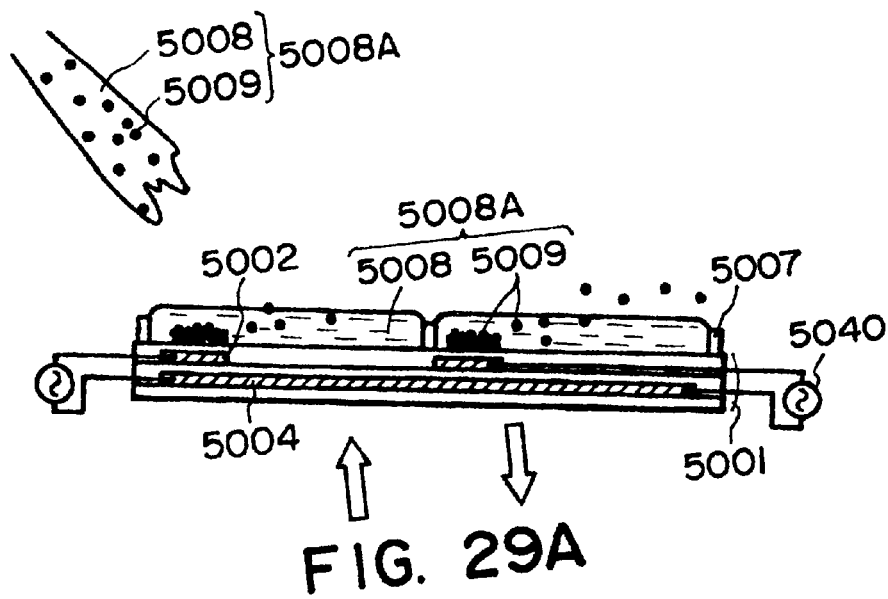
Figure 29B:
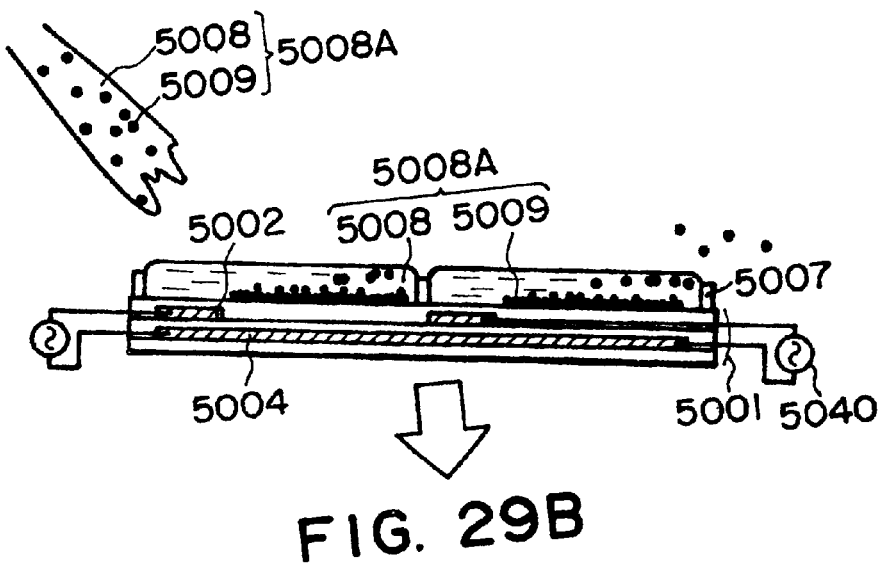
Figure 29C:
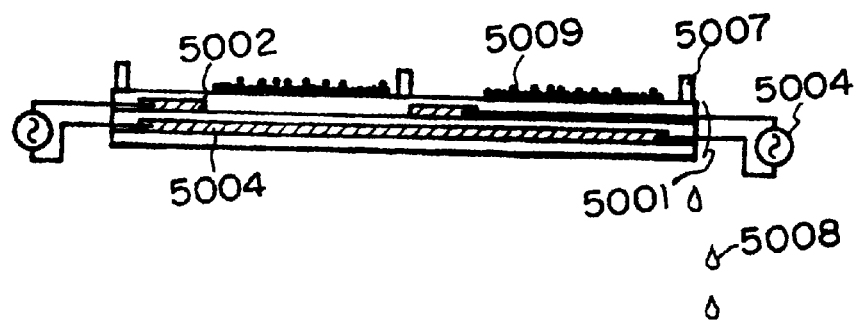

In the case of pouring the dispersion liquid 5008A onto the first substrate, it is preferred to hold the first substrate 5001 at an appropriately inclined state and apply a voltage between the electrodes thereby removing an excess of the dispersion liquid 5008A, particularly the dispersion liquid medium 5008 (FIG. 29C). In this instance, the first substrate 5001 can be vibrated or rotated so as to effectively remove the excessive dispersion liquid 5008A. The inclination angle may be any angle within 1 to 177 deg., but preferably 30 to 150 deg.

The voltage applied between the electrodes may be controlled depending on the cell size (pixel size) so as to retain an amount of charged phoretic particles 5009 attracted to the first electrode 5002 or second electrode 5004 sufficient for providing a dispersion liquid for electrophoretic display and obtain a desired charge distribution of the charged phoretic particles 5009. The voltage applied for these purposes may have an amplitude of 1 to 300 volts and a frequency of 0.01 to 50 Hz, and may preferably be applied for ca. 5 to 10 min. The voltage waveform is not particularly restricted.

The substrate may comprise a film of a heat-resistant resin, such as PET (polyethylene terephthalate) or PES (polyether sulfone), or an inorganic material, such as glass or quartz. However, in view of the application of vibration, it is preferred to use a breakage-resistant material, e.g., a resin such as PET, than an inorganic material, such as glass. The thickness may appropriately selected depending on the usage.

The electrodes 5002 and 5004 may be formed of a metal or a metal oxide, e.g., Al, Au, Pt, Ag, Ni, Ti, Cr, ITO (indium tin oxide), ZnO, $SnO_2$, etc. The electrodes on the viewer's side substrate may preferably be composed of a transparent electrode material, such as ITO.

The electrophoretic particles (charged phoretic particles) may representatively comprise titanium oxide (titanium white), but may also be formed from appropriately selected other materials, such as well-known colloid particles, various organic and inorganic pigments, dyes, metal powders, fine powders of glass and resins, these materials further containing a colorant, and a mixture of polystyrene and carbon black. The particle size may ordinarily range from 0.1 to 50 $\mu$m. For allowing a high-resolution display, a particle size of ca. 0.1 to 5 $\mu$m is preferred. If the process of the present invention is adopted, a dispersion liquid containing such minute electrophoretic particles at an appropriate concentration can be sealed up within the display device at a good dispersion state.

Electrophoretic particles of identical species of material are ordinarily charged to an identical polarity, but in case where a dispersion liquid contains a portion of charged phoretic particles having a different polarity, such a portion may preferably be removed by electrophoresis, etc. to select charged phoretic particles of an identical polarity, prior to deposition of the charged phoretic particles on the substrate.

The dispersion liquid medium may comprise any insulating liquid, examples of which may include: silicone oil, toluene, xylene, high-purity petroleum, and isoparaffinic hydrocarbons. The dispersion liquid medium can be used in mixture with a colorant as far as the insulating property is not impaired thereby.

The dispersion liquid may preferably contain a charge control agent. This is also effective for controlling the charge of the charged phoretic particles to provide a designed adsorption force for adsorbing the charged phoretic particles 5009 onto the electrodes in the state of voltage application for electrophoretic display of the product display device.

By controlling the charge of the charged phoretic particles, it is possible to provide a good compromise between display memory characteristic and degradation of display quality. More specifically, a larger charge of charged phoretic particles provides a better display memory characteristic due to stronger adsorption of charged phoretic particles onto the electrodes at a stronger inter-molecular force, but too large a charge is liable to gradually result in sticking of the charged phoretic particles onto the electrodes, thus resulting in an inferior contrast. The appropriate charge control can obviate such a difficulty.

The charge control agent may be a positive charge control agent or a negative charge control agent. As positive charge control agents, it is possible to use a naphthenic acid salt of a metal, such as cobalt, manganese or iron, zirconium octenate, etc. and as negative control agents, it is possible to use lecithin, calcium petroleum-sulfonate, calcium alkylbenzene-sulfonate, sodium dioctylsulfonate, alkylalanine, etc. Such a charge control agent may be contained in either a dispersion liquid medium or disposed phoretic particles, or in both of them.

(Second Step)

Figure 30:
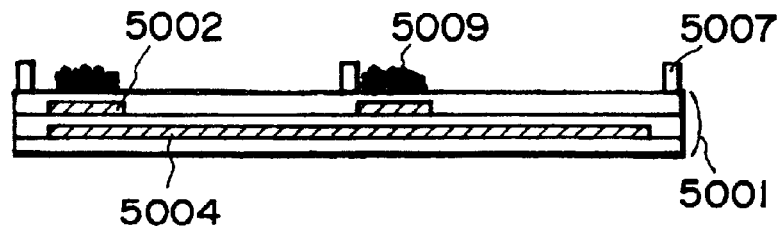

An appropriate portion of the dispersion liquid medium 5008 is evaporated off. The degree of vaporization may preferably be such as to provide a state where the charged phoretic particles are just wetted with the dispersion liquid medium 5008 (FIG. 30).

By including this step, a good bonding state can be obtained in the subsequent step of bonding the two substrates as substantially no dispersion liquid medium remains at the bonding surfaces, and the charged phoretic particles are well retained on the substrate due to a surface tension of the remaining dispersion liquid medium 5008, thus obviating the separation or floating of the charged phoretic particles 5009 until a later step of injection of the dispersion liquid medium 5008 into a non-filled device.

The evaporation of the dispersion liquid medium 5008 can also be effected by natural cooling in the atmosphere, but a drying in a closed atmosphere, such as in a desiccator may be preferred. It is also possible to apply heat, as desired, for promoting the evaporation.

(Third Step)

The first substrate 5001 and the second substrate 5003 are bonded to each other to form a non-filled device while leaving an injection port for injecting an additional portion of dispersion liquid medium in a later step.

The bonding agent may for example be a hot melt adhesive or an ultraviolet-curable adhesive (inclusive of a commercially available UV-curable adhesive of "Luxtrak LCR 0634", made by Toa Gosei K.K.

(Fourth Step)

Figure 33:
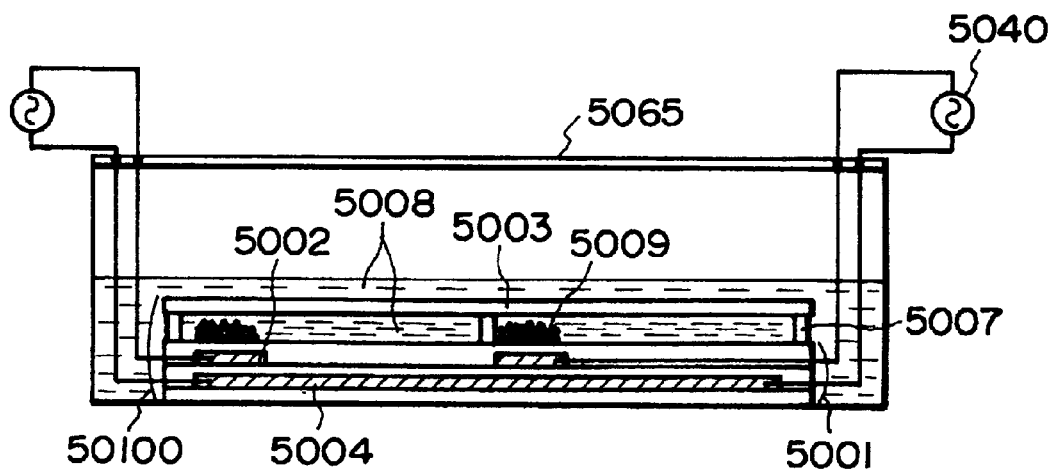

The non-filled device is placed at a gaseous phase in a closed vessel 5065 containing a prescribed volume of dispersion liquid medium 5008, and the gaseous phase is evacuated to a reduced pressure below the atmospheric pressure. Then, the non-filled device is immersed in the bath of dispersion liquid medium 5008, and the gaseous phase is restored to the atmospheric pressure, thereby injecting the dispersion liquid medium 5008 through the injection port to fill the device 50100 (FIG. 33).

In this instance, it is preferred to apply an appropriate strength of DC voltage in the range of 1 to 300 volts between the electrodes 502 and 5004 so as to attract the charged phoretic particles 5009 to the electrodes thereby obviating the disturbance or movement of the charged phoretic particles into adjacent cells due to flow of the injected dispersion liquid medium 5008.

(Fifth Step)

Figure 34:
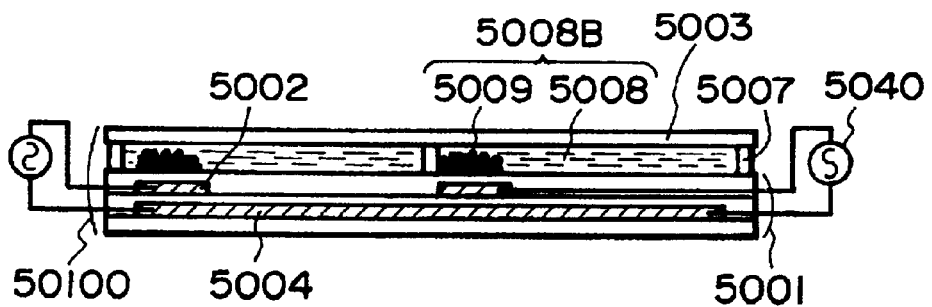

The filled device 50100 is taken out of the closed vessel 5065, and the injection port is plugged with an adhesive to seal up the dispersion liquid 5008B within the device 50100. Also in this plugging operation, it is preferred to apply a voltage between the first electrodes 5002 and the second electrode 5004 so as to attract the charged phoretic particles toward the electrodes (FIG. 34).

(Sixth Step)

Figure 35:
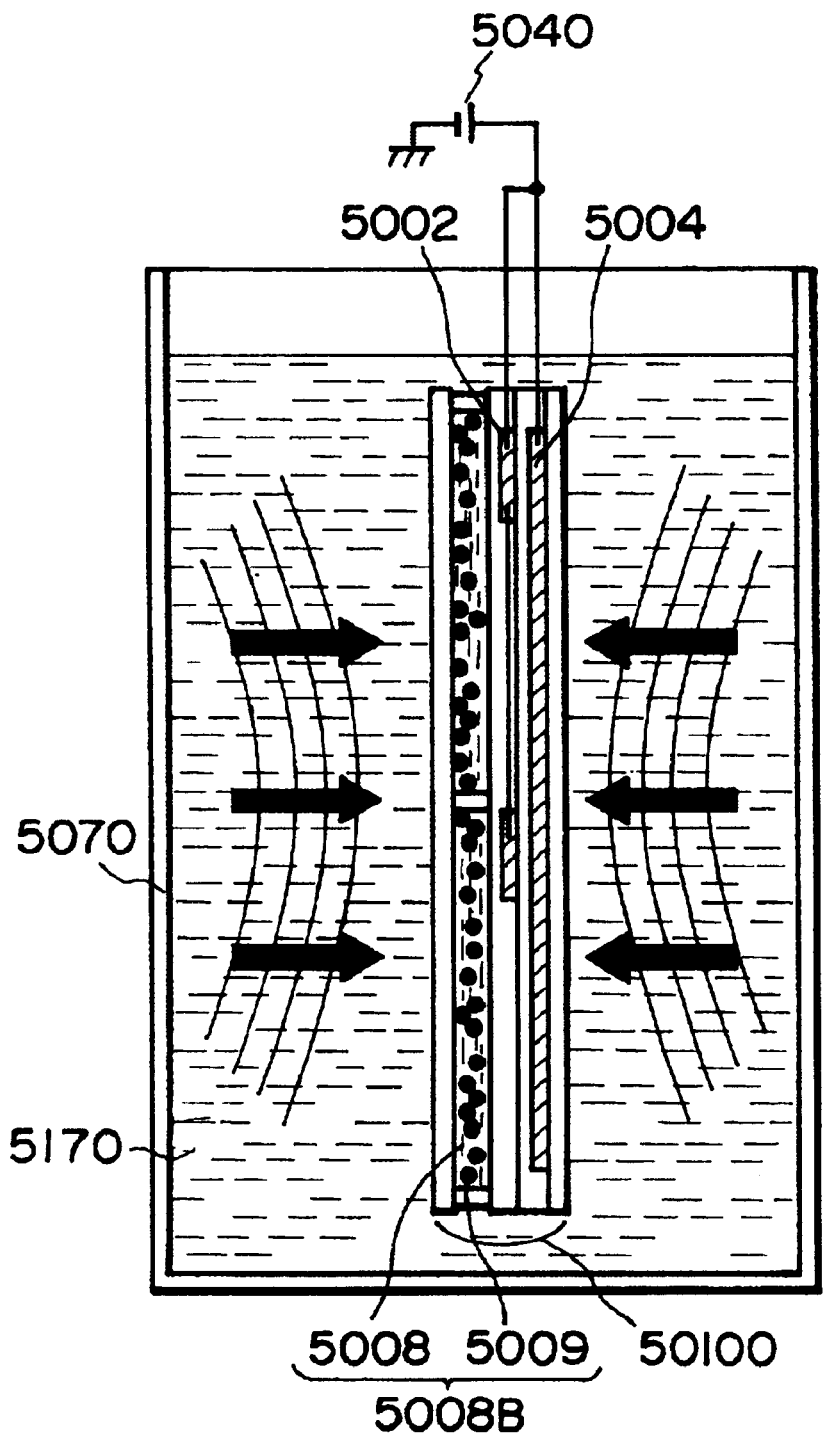

A vibration is imparted to the charged phoretic particles 5009 localized at the electrodes to diffuse the charged phoretic particles 5009 in respective cells. FIG. 35 illustrates an example of this step performed by applying ultrasonic wave to the device 50100 from an ultrasonic applicator 5070 via a vibration-transmission medium 5170 in which the device 50100 is immersed. Alternatively, it is also possible to apply a mechanical imparting force by impingement of liquid droplets, a solid member, such as a hammer in a strength not adversely affecting the device per se. It is also possible to apply external electromagnetic force without via the electrodes 5002 are 5004. In this instance, it is preferred to simultaneously apply a DC voltage of, e.g., +15 volts, to both electrodes, of a polarity identical to the charge polarity of the charged phoretic particles 5009 in the dispersion liquid medium 5008 so as to promote the diffusion of the charged phoretic particles in the dispersion liquid medium 5008. It is also possible to apply an AC voltage for promoting the diffusion of the charged phoretic particles.

The vibration-transmission medium 5170 may comprise a gas, a liquid or a solid capable of transmitting vibration, but it is preferred to use a liquid medium identical to the dispersion liquid medium 5008 contained in the device 50100, such as silicone oil, toluene, xylene, high-purity petroleum, or isoparaffinic hydrocarbon.

The strength of the vibration may be appropriately selected depending on the strength of the substrates and also the strength of agglomeration of the charged phoretic particles, and the frequency may be selected from a range of 10 Hz to 100 kHz. For example, in the case of using a PET substrate and charged phoretic particles comprising a polystyrene-carbon mixture, a frequency of 1 to 50 kHz may suitably be used.

Incidentally, the above process can also be performed by using an electrode sheet provided with a pair of electrodes also as a second substrate. In this case, the above-described first and second steps are applied to both the first and second substrates and the thus-processed first and second substrates are subjected to the subsequent steps starting from the third step of bonding the first and second substrates to each other. In this case, either one of the first and second substrate 5001 and 5003 is provided with electrodes of transparent conductor materials.

(Embodiment 5-2)

According to this embodiment, the process for producing an electrophoretic (display) device comprises sequential steps including a first step of printing an ink containing charged phoretic particles onto a substrate; a second step of applying two substrates to each other; a third step of filling the dispersion liquid medium between the substrates to form a dispersion liquid; a fourth step of sealing up the dispersion liquid within the device (panel); and a fifth step of imparting vibration to the charged phoretic particles to cause a diffusion of the charged phoretic particles in the dispersion liquid medium. The respective steps will be described in further detail below.

(First Step)

Figure 32:
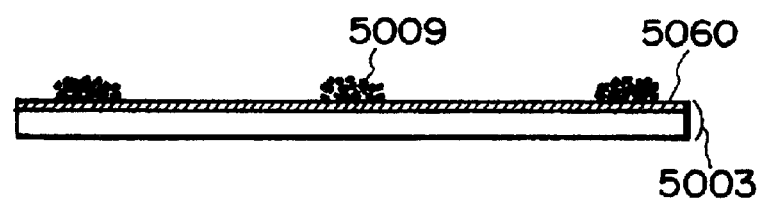

An ink containing charged phoretic particles is printed on a substrate (either a first substrate or a second substrate). According to this method, it is possible to easily control the deposition amount of the charged phoretic particles per unit area on the substrate, thereby later providing a dispersion liquid for electrophoretic display having an appropriate concentration and its distribution. In this instance, it preferred to pre-coat the surface to be printed of the substrate with a fluorine-containing resin so as to promote the separation and diffusion of the charged phoretic particles in a later step. FIG. 32 illustrates a case of printing on a second substrate 5003.

Any fluorine-containing resin promoting releasability may be used inclusive of "FLUORADO FC-722" (made by Sumitomo 3M K.K.). In this case of printing on a viewer's side substrate, it is necessary to use a transparent fluorine-containing resin inclusive of "CYTOP" (made by Asahi Garasu K.K.).

(Second Step)

The substrate printed with charged phoretic particles 5009 is bonded with its printed side directed inwards to another substrate while leaving an injection port for injecting a dispersion liquid medium 5008 in a later step (not shown).

(Third to Fifth Steps)

These steps are substantially identical to Fourth to Sixth steps of Embodiment 5-1.

(Embodiment 5-3)

According to this embodiment, the process for producing an electrophoretic (display) device comprises sequential steps including a first step of distributing a dispersion liquid through a nozzle onto a substrate provided with a spacer, a second step of bonding another substrate to seal up the dispersion liquid within the device (panel); and a third step of imparting a vibration to the charged phoretic particles to cause a diffusion of the charged phoretic particles in the dispersion liquid medium. The respective steps will be described in further detail below.

(First Step)

Onto a first substrate 5001 provided with a spacer 5007, a dispersion liquid comprising a mixture of a dispersion liquid medium and charged phoretic particles 5009 is distributed to cells defined by the spacer 5007 on the first substrate 5001. As a result, it is possible to easily control the amount of the dispersion liquid per unit area on the first substrate, thereby providing a dispersion liquid for electrophoretic display having an appropriate concentration of charged phoretic particles (FIG. 34).

(Second Step)

While retaining the distributed state of the dispersion liquid on the first substrate 5001, another substrate is bonded thereto to seal up the dispersion liquid in the resultant device.

In the above first and second steps, it is preferred to apply a DC voltage of, e.g., 10 to 100 volts between the first electrodes 5002 and the second substrate 5004, thereby preventing the flowing of the charged phoretic particles 5009 out of the cells.

(Third Step)

This step is substantially identical to Sixth step of Embodiment 5-1.

Some specific examples of the above-described Examples will be described below.

EXAMPLE 5-1

This is an example of Embodiment 5-1.

In this example, on a ca. 200 $\mu$m-thick PET film, an ITO electrode was formed as a second electrode 5004 which could be observed in white by reflection, first electrodes 5002 having a lower metal layer coated with a dark black-color resist layer were formed, and a spacer 5007 was formed of a photoresist, to provide a first substrate 5001 (as an electrode sheet). Ca. 1 to 2 $\mu$m-dia. black electrophoretic particles 5009 were formed of a polystyrene-carbon mixture, and mixed with a dispersion liquid medium 5008 comprising a principally hydrocarbon liquid ("ISOPER" made by Exxon K.K.) containing rosin ester as a charge control agent to provide a dispersion liquid 5008A; wherein the charged phoretic particles 5009 were positively charged. The concentration of the charged phoretic particles 5009 was set to be lower than that in the objective electrophoretic display device finally produced.

(First Step)

Into a bath of the above-prepared dispersion liquid 5008 under mild stirring, the above prepared first substrate 5001 was dipped with its electrode-provided surface directed downwards. Immediately thereafter, a rectangular AC voltage of ±60 volts and 1 Hz was started to be applied between the first electrodes 5002 and the second electrode 5004. The voltage application was continued for 8 min. (FIG. 28A).

Then, a DC voltage of 120 volts was applied between the first electrodes 5002 (negative) and the second electrode 5004 (positive) so as to attract the positively charged phoretic particles 5009 to the first electrodes 5002, and in this state, the level of the dispersion liquid 5008A in the vessel was gradually lowered to take the first substrate 5001 out of the dispersion liquid 5008A (FIG. 28C).

(Second Step)

Then, the first substrate 5001 carrying the charged phoretic particles 5009 together with a substantial amount of the dispersion liquid medium 5008 was placed in a dessiccator to evaporate off the dispersion liquid medium 5008 to a state of just wetting the charged phoretic particles 5009 (FIG. 30).

(Third Step)

The peripheries and other bonding parts of the above-treated first substrate 5001 and a second substrate 5003 (of also a ca. 200 m-thick PET film) were heat-bonded with an adhesive ("STAFIX", made by Fuji Film K.K.) while leaving an injection port for injecting an additional dispersion liquid medium in a later step to form a non-filled device.

(Fourth Step)

The non-filled device was placed at a gaseous phase of a closed vessel 5065 containing a prescribed volume of dispersion liquid medium 5008, and the gaseous phase was evacuated to a reduced pressure below the atmospheric pressure. Then, the non-filled device was immersed in the dispersion liquid medium 5008 while applying a DC voltage of 200 volts between the first electrodes 5002 (negative) and the second electrode 5004 (positive), so as to attract the positively charged phoretic particles 5009 at the first electrodes 5002.

Then, the pressure of the gaseous phase in the closed vessel 5065 was restored to the atmospheric pressure to inject the dispersion liquid medium 5008 through the injection port into the device 50110 (FIG. 33).

(Fifth Step)

Then, the device 50100 was quickly taken out of the closed vessel 5065, and the injection port was plugged with an adhesive (FIG. 34).

(Sixth Step)

The filled device 50100 was then immersed in a vibration-transmission fluid 5170 ("ISOPER", made by Exxon Co.; identical to the dispersion liquid medium 5008 except for not containing a charge control agent) contained in an ultrasonic wave applicator 5070, wherein the device 50100 was supplied with a vibration at a frequency of 50 kHz so as to diffuse the charged phoretic particles localized in the dispersion liquid 5008B, while supplying a DC voltage of +15 volts to both the first electrodes 5002 and the second electrode 5004, i.e., the sample polarity of voltage as the charged potential of the charged phoretic particles 5009 (FIG. 35).

Through the above steps, an electrophoretic display device having a cell size of 100 μm-square was formed by using small particle-sized charged phoretic particles 5009. The electrophoretic display device 50110 thus-prepared exhibited a display contrast of 8 at a response speed of ca. 10 msec when supplied with a drive voltage of ±40 volts between the first electrodes 5002 and the second electrode 5004 from the voltage application circuit 5040.

EXAMPLE 5-2

This is also an example of Embodiment 5-1.

Figure 5:
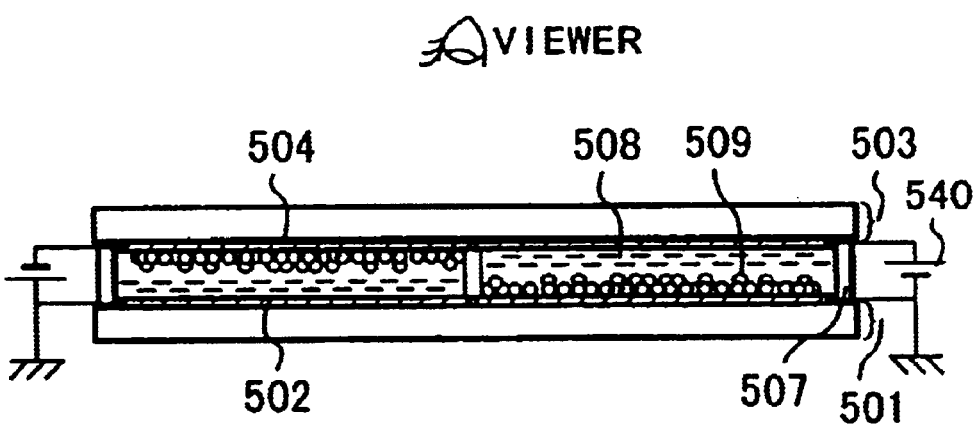

The materials used were identical to those in FIG. 5-1.

(First Step)

The dispersion liquid 5008A was ejected at a rate of 10 ml/sec for 6 min. out of a 100 μm-dia. nozzle onto the electrode-provided surface of the first substrate 5001 held obliquely at an angle of ca. 30 deg. from the horizon while a rectangular AC voltage of ±60 volts and 1 Hz was applied between the first electrodes 5002 and the second electrode 5004 (FIGS. 29A–29C).

(Second to Sixth Steps)

The above-treated first substrate 5001 was subjected to substantially identical treatments as in Second and Sixth steps of Example 5-1. The resultant electrophoretic display device exhibited similar performances as in Example 5-1.

EXAMPLE 5-3

This is an example of Embodiment 5-3.

The materials used were identical to those in Example 5-1 except for the bonding agent.

(First Step)

Figure 31:
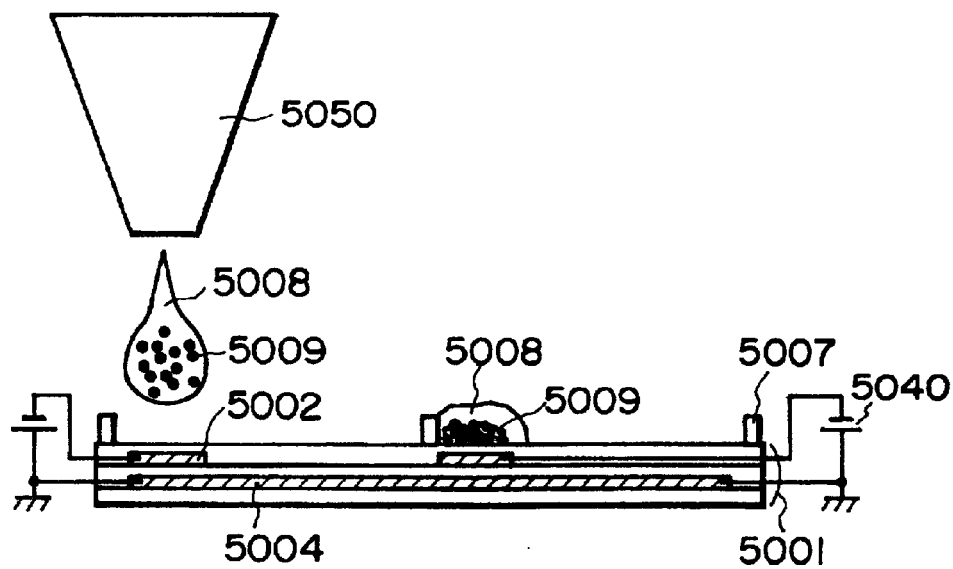

A dispersion liquid 5008B (having a charged phoretic particle concentration identical to that for electrophoretic display) was distributed to cells defined by the spacer 5007 while applying a DC voltage of 50 volts between the first electrodes 5002 (negative) and the second electrode 5004 (positive) so as to attract the charged phoretic particles 5009 to the first electrodes 5002 (FIG. 31).

(Second Step)

The peripheries and other bonding portions of the above-treated first substrate 5001 and the second substrate 5002 were bonded to each other with a UV-curable adhesive ("LUXTRAK LCR0634", made by Toa Gosei K.K.) while applying a DC voltage of 100 volts between the first electrodes 5002 (negative) and the second electrode 5004 (positive) so as to attract the charged phoretic particles 5009 to the first electrodes 5002 to form a display device 50100 (FIG. 34).

(Third Step)

Liquid droplets were ejected at a rate of 10 ml/sec from a 100 μm-dia. nozzle onto the display device 50100 so as to apply a vibration to the charged phoretic particles 5009 in the dispersion liquid 5008B while applying a DC voltage of +15 volts (of an identical polarity to the charge of the phoretic particles 5009) to both the first electrodes 5002 and the second electrode 5004.

The thus-produced electrophoretic display device exhibited similar performances as in Example 5-1.

EXAMPLE 5-4

This is an example of Embodiment 5-2.

The materials used were identical to those used in Example 5-1 except for the use of a second substrate coated with a fluorine-containing resin.

(First Step)

Electrophoretic particles 5009 were provided by means of copying apparatus (not shown) onto a second substrate 5003 coated with a layer 5060 of a fluorine-containing resin ("CYTOP", made by Asahi Garasu K.K.)

(Second to Fifth Step)

Except for the use of the thus-treated second substrate and the untreated first substrate, the operations of Third to Sixth steps of Example 5-1 were repeated.

The thus-produced electrophoretic display device exhibited similar performances as in Example 5-1.

EXAMPLE 5-5

This is an example of Embodiment 5-2.

The materials used were identical to those used in Example 5-1 except for the use of a first substrate coated with a fluorine-containing resin.

(First Step)

Electrophoretic particles 5009 were provided by means of copying apparatus (not shown) onto a first substrate 5001 coated with a layer 5060 of a fluorine-containing resin ("FLUORADO", made by Sumitomo 3M K.K.)

(Second to Fifth Step)

Except for the use of the thus-treated first substrates, the operations of Third to Sixth steps of Example 5-1 were repeated.

The thus-produced electrophoretic display device exhibited similar performances as in Example 5-1.

EXAMPLE 5-6

Figure 37A:
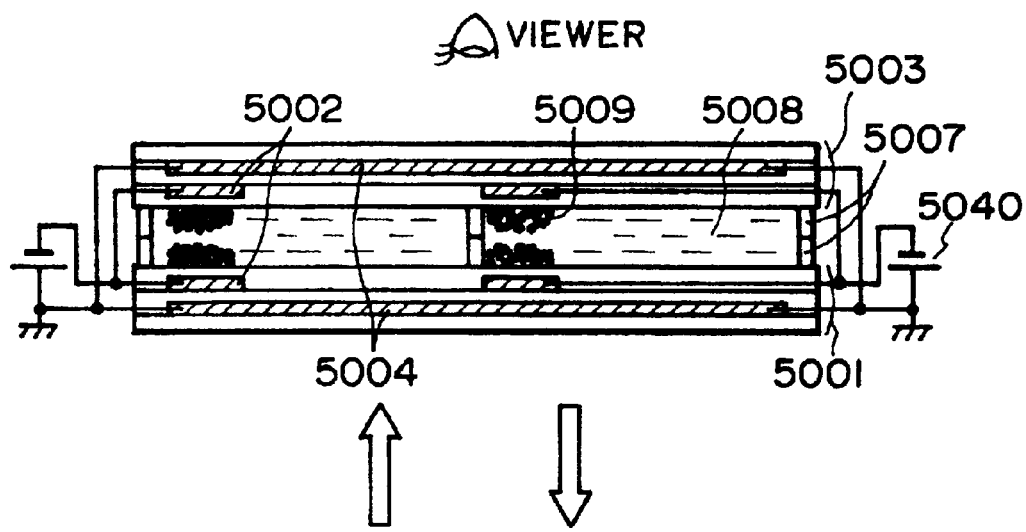
FIGS. 37A and 37B are schematic sectional views for illustrating an organization and an operation principle of another electrophoretic display device prepared according to the invention.
Figure 37B:
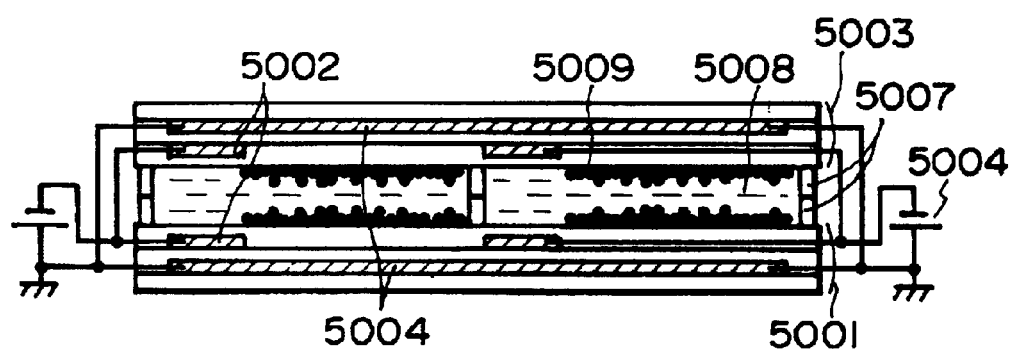

An electrophoretic display device as illustrated in FIGS. 37A and 37B including two electrode sheets (i.e., a first electrode sheet 5001 farther from a viewer and a second electrode sheet 5003 closer to the viewer) was produced in the following manner.

Each of the first and second electrode sheets 5001 and 5003 was prepared in the same manner as the electrode sheet 5010 in Example 5-1 except that the first electrodes 5002 and the second electrode 5004 on the second electrode sheet 5003 were formed of transparent indium tin oxide (ITO). Moreover, a dispersion liquid medium 5008, charged phoretic particles 5009 and a dispersion liquid 5008A were prepared in the same manner as in Example 5-1.

(First Step)

The first substrate 5001 was dipped in the dispersion liquid 5008A with its electrode-provided surface directed downwards. Immediately thereafter, a rectangular AC voltage of ±60 volts and 1 Hz was started to be applied between the first electrodes 5002 and the second electrode 5004. The voltage application was continued for 8 min. (FIG. 28A).

Then, the level of the dispersion liquid 5008A in the vessel was gradually lowered to take the first substrate 5001 out of the dispersion liquid 5008A while applying a DC voltage of 120 volts between the first electrodes 5002 (as positive electrode) and the second substrate 5004 (as negative electrode) (FIG. 28C).

Then, as a second step, the electrode sheet 5010 carrying the charged phoretic particles 5009 was inverted upside-down, and the voltage was released.

(Second Step)

Then, the first substrate 5001 carrying the charged phoretic particles 5009 together with a substantial amount of the dispersion liquid medium 5008 was placed in a desiccator to evaporate off the dispersion liquid medium 5008 to a state of just wetting the charged phoretic particles 5009 (FIG. 30).

The second substrate 5003 was also subjected to First and Second steps similarly as above.

(Third Step)

The peripheries and other bonding parts of the above-treated first substrate 5001 and a second substrate 5003 were heat-bonded with an adhesive ("STAFIX", made by Fuji Film K.K.) while leaving an injection port for injecting an additional dispersion liquid medium in a later step to form a non-filled device.

(Fourth Step)

The non-filled device was placed at a gaseous phase of a closed vessel 5065 containing a prescribed volume of dispersion liquid medium 5008, and the gaseous phase was evacuated to a reduced pressure below the atmospheric pressure. Then, the non-filled device was immersed in the dispersion liquid medium 5008 while applying a DC voltage of 200 volts between the first electrodes 5002 (negative) and the second electrode 5004 (positive), so as to attract the positively charged phoretic particles 5009 at the first electrodes 5002.

Then, the pressure of the gaseous phase in the closed vessel 5065 was restored to the atmospheric pressure to inject the dispersion liquid medium 5008 through the injection port into the device 50110 (FIG. 33).

(Fifth Step)

Then, the device 50100 was quickly taken out of the closed vessel 5065, and the injection port was plugged with an adhesive (FIG. 34).

(Sixth Step)

The filled device 50100 was then immersed in a vibration-transmission fluid 5170 ("ISOPER", made by Exxon Co.; identical to the dispersion liquid medium 5008 except for not containing a charge control agent) contained in an ultrasonic wave applicator 5070, wherein the device 50100 was supplied with a vibration at a frequency of 50 kHz so as to diffuse the charged phoretic particles localized in the dispersion liquid 5008B, while supplying a DC voltage of +15 volts to both the first electrodes 5002 and the second electrode 5004, i.e., the sample polarity of voltage as the charged potential of the charged phoretic particles 5009 (FIG. 35).

Thereafter, the device 50100 was taken out of the ultrasonic applicator 5070 to obtain an electrophoretic display device.

The thus-obtained electrophoretic display device exhibited a contrast of 8 at a response time of ca. 7 msec when a drive voltage of ±50 volts was synchronously applied between the first electrodes 5002 and the second electrodes 5004 on the first and second electrodes respectively.

As described above, according to Fifth embodiment of the present invention, it becomes possible to realize a good distribution state of charged phoretic particles, thereby providing an electrophoretic display device having improved resolution and contrast.

Hereinabove, the present invention has been described with reference to the production of an electrophoretic display device, but the device produced by the present invention is also applicable as another device also utilizing electrophoresis, such as a dimmer device and a photo-indicator.

What is claimed is:

1. A process for producing an electrophoretic device comprising a pair of a first substrate and a second substrate, of which at least the first substrate is provided with a first electrode and a second electrode between which a voltage can be applied, and a dispersion liquid disposed between the first and second electrodes and comprising a dispersion liquid medium and electrophoretic particles dispersion therein; said process comprising:

a first step of depositing the electrophoretic particles on the first substrate, a second step of pouring the dispersion liquid medium over the electrophoretic particles on the first substrate to form the dispersion liquid, and a third step of sealing the dispersion liquid between the first substrate and the second substrate.

2. A process according to claim 1, wherein in the first step, a voltage is applied between the first and second electrodes in contact with a mixture of the electrophoretic particles and the dispersion liquid medium to cause electrophoresis of the electrophoretic particles, thereby depositing the electrophoretic particles on either the first electrode or the second electrode.

3. A process according to claim 2, wherein the voltage applied in the first step has a polarity or an amplitude varying with time.

4. A process according to claim 2, wherein the first substrate is repetitively moved in the first step.

5. A process according to claim 1, wherein in the second step, the dispersion liquid medium is poured to supplement the dispersion liquid medium.

6. A process according to claim 1, wherein in the second step, a voltage is applied between the first electrode and the second electrode to hold the electrophoretic particles on either the first electrode or the second electrode.

7. A process according to claim 1, wherein in the third step, a voltage is applied between the first electrode and the second electrode to hold the electrophoretic particles on either the first electrode or the second electrode.

8. A process according to claim 1, wherein in the first step, an AC voltage is applied between the first electrode and the second electrode.

9. A process for producing an electrophoretic display device comprising a pair of a first substrate and a second substrate, of which at least the first substrate is provided with a first electrode and a second electrode between which a voltage can be applied, and a dispersion liquid disposed between the first and second electrodes and comprising a dispersion liquid medium and electrophoretic particles dispersion therein; said process comprising:
  a first step of depositing the electrophoretic particles on the first substrate,
  a second step of pouring the dispersion liquid medium over the electrophoretic particles on the first substrate to form the dispersion liquid, and
  a third step of sealing the dispersion liquid between the first substrate and the second substrate.

10. A process according to claim 9, wherein in the first step, a voltage is applied between the first and second electrodes in contact with a mixture of the electrophoretic particles and the dispersion liquid medium to cause electrophoresis of the electrophoretic particles, thereby depositing the electrophoretic particles on either the first electrode or the second electrode.

11. A process according to claim 10, wherein the voltage applied in the first step has a polarity or an amplitude varying with time.

12. A process according to claim 10, wherein the first substrate is repetitively moved in the first step.

13. A process according to claim 9, wherein in the second step, the dispersion liquid medium is poured to supplement the dispersion liquid medium.

14. A process according to claim 9, wherein in the second step, a voltage is applied between the first electrode and the second electrode to hold the electrophoretic particles on either the first electrode or the second electrode.

15. A process according to claim 9, wherein in the third step, a voltage is applied between the first electrode and the second electrode to hold the electrophoretic particles on either the first electrode or the second electrode.

16. A process for producing an electrophoretic device comprising a pair of a first substrate and a second substrate, of which at least the first substrate is provided with electrodes and a dispersion liquid disposed between the first and second electrodes and comprising a dispersion liquid medium and electrophoretic particles dispersion therein; said process comprising;
  a first step of depositing the electrophoretic particles on an electrode-provided surface of the first substrate,
  a second step of washing the electrode-provided surface of the first substrate carrying the deposited electrophoretic particles thereon with the dispersion liquid medium alone or in mixture with the electrophoretic particles,
  a third step of pouring the dispersion liquid medium over the electrode-provided surface of the first substrate to form the dispersion liquid on the first substrate, and
  a fourth step of sealing the dispersion liquid between the first substrate and the second substrate.

17. A process according to claim 16, wherein in the first step, the first substrate is dipped in a mixture of the dispersion liquid medium and the charged phoretic particles to deposit the electrophoretic particles on the electrode-provided surface of the first substrate.

18. A process according to claim 16, wherein in the first step, a mixture of the dispersion liquid medium and the electrophoretic particles is ejected or poured onto the electrode-provided surface of the first substrate to deposit the electrophoretic particles on the electrode-provided surface of the first substrate.

19. A process according to claim 16, wherein in the first step, a mixture of the dispersion liquid medium and the electrophoretic particles is printed on the first substrate to deposit the electrophoretic particles on the electrode-provided surface of the first substrate.

20. A process according to claim 16, wherein in the first step, a mixture of the dispersion liquid medium and the electrophoretic particles is caused to contact the electrode-provided surface of the first substrate while a voltage is applied to the electrodes.

21. A process according to claim 20, wherein the voltage applied in the first step has a polarity or an amplitude varying with time to move the electrophoretic particles on the first substrate.

22. A process according to claim 16, wherein in the first step, the first substrate is vibrated or rotated.

23. A process according to claim 16, wherein in the second step, the dispersion liquid medium alone or in mixture with the electrophoretic particles is caused to contact the electrode-provided surface of the first substrate under application of a voltage to the electrodes, thereby removing an excessive portion of the electrophoretic particles or supplementing an amount of the electrophoretic particles on the first substrate.

24. A process according to claim 23, wherein the voltage applied in the second step has a polarity or an amplitude varying with time to move the electrophoretic particles on the first substrate.

25. A process according to claim 16, wherein in the second step, the first substrate is vibrated or rotated.

26. A process according to claim 16, wherein in the third step, the dispersion liquid medium is added to supplement the dispersion liquid medium between the first substrate and the second substrate.

27. A process according to claim 16, wherein in the third step, a voltage is applied to the electrodes to move the electrophoretic particles to the electrodes.

28. A process according to claim 16, wherein in the fourth step, a voltage is applied to the electrodes so as to move the electrophoretic particles to the electrodes.

29. A process for producing an electrophoretic display device comprising a pair of a first substrate and a second substrate, of which at least the first substrate is provided with electrodes and a dispersion liquid disposed between the first and second electrodes and comprising a dispersion liquid medium and electrophoretic particles dispersion therein; said process comprising:

a first step of depositing the electrophoretic particles on an electrode-provided surface of the first substrate, a second step of washing the electrode-provided surface of the first substrate carrying the deposited electrophoretic particles thereon with the dispersion liquid medium alone or in mixture with the electrophoretic particles, a third step of pouring the dispersion liquid medium over the electrode-provided surface of the first substrate to form the dispersion liquid on the first substrate, and a fourth step of sealing the dispersion liquid between the first substrate and the second substrate.

30. A process according to claim 29, wherein in the first step, the first substrate is dipped in a mixture of the dispersion liquid medium and the electrophoretic particles to deposit the electrophoretic particles on the electrode-provided surface of the first substrate.

31. A process according to claim 29, wherein in the first step, a mixture of the dispersion liquid medium and the electrophoretic particles is ejected or poured onto the electrode-provided surface of the first substrate to deposit the electrophoretic particles on the electrode-provided surface the first substrate.

32. A process according to claim 29, wherein in the first step, a mixture of the dispersion liquid medium and the electrophoretic particles is printed on the first substrate to deposit the electrophoretic particles on the electrode-provided surface of the first substrate.

33. A process according to claim 29, wherein in the first step, a mixture of the dispersion liquid medium and the electrophoretic particles is caused to contact the electrode-provided surface of the first substrate while a voltage is applied to the electrodes.

34. A process according to claim 33, wherein the voltage applied in the first step has a polarity or an amplitude varying with time to move the electrophoretic particles on the first substrate.

35. A process according to claim 29, wherein in the first step, the first substrate is vibrated or rotated.

36. A process according to claim 29, wherein in the second step, the dispersion liquid medium alone or in mixture with the electrophoretic particle is caused to contact the electrode-provided surface of the first substrate under application of a voltage to the electrodes, thereby removing an excessive portion of the electrophoretic particles or supplementing an amount of the electrophoretic particles on the first substrate.

37. A process according to claim 36, wherein the voltage applied in the second step has a polarity or an amplitude varying with time to move the electrophoretic particles on the first substrate.

38. A process according to claim 29, wherein the second step, the first substrate is vibrated or rotated.

39. A process according to claim 29, wherein in the third step, the dispersion liquid medium is added to supplement the dispersion liquid medium between the first substrate and the second substrate.

40. A process according to claim 29, wherein in the third step, a voltage is applied to the electrodes to move the electrophoretic particles to the electrodes.

41. A process according to claim 29, wherein in the fourth step, a voltage is applied to the electrodes to move the electrophoretic particles to the electrodes.

* * * * *

UNITED STATES PATENT AND TRADEMARK OFFICE
CERTIFICATE OF CORRECTION

PATENT NO. : 6,919,003 B2
APPLICATION NO. : 09/814734
DATED : July 19, 2005
INVENTOR(S) : Tsutomu Ikeda et al.

It is certified that error appears in the above-identified patent and that said Letters Patent is hereby corrected as shown below:

COLUMN 4:

Line 12, "large a" should read --a large--.

COLUMN 5:

Line 52, "electrophoretic" should read --electrophoretic particles--.

COLUMN 22:

Line 17, "43018" should read --4108--.

COLUMN 35:

Line 28, "m-thick" should read --µm-thick--.

COLUMN 41:

Line 30, "face" should read --face of--.

COLUMN 42:

Line 23, "wherein" should read --wherein in--.

Signed and Sealed this

Fifteenth Day of August, 2006

JON W. DUDAS
*Director of the United States Patent and Trademark Office*